United States Patent [19]

McDonnal et al.

[11] Patent Number: 5,796,825

[45] Date of Patent: Aug. 18, 1998

[54] SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL-TIME

[75] Inventors: William D. McDonnal, Tigard; Shawn Lohstroh, Beaverton; David Grawrock, Aloha, all of Oreg.

[73] Assignee: Symantec Corporation, Cupertino, Calif.

[21] Appl. No.: 944,397

[22] Filed: Oct. 6, 1997

Related U.S. Application Data

[62] Division of Ser. No. 586,511, Jan. 16, 1996, Pat. No. 5,699,428.

[51] Int. Cl.$^6$ .................................................. H04L 9/00
[52] U.S. Cl. ................................. 380/4; 380/25; 380/49
[58] Field of Search ................................. 380/4, 25, 49

[56] References Cited

U.S. PATENT DOCUMENTS

| | | | |
|---|---|---|---|
| 5,394,469 | 2/1995 | Nagel et al. | 380/4 |
| 5,481,701 | 1/1996 | Chambers, IV | 395/600 |
| 5,584,022 | 12/1996 | Kikuchi et al. | 380/49 |
| 5,606,610 | 2/1997 | Johansson | 380/4 |
| 5,699,428 | 12/1997 | McDonnal et al. | 380/4 |

*Primary Examiner*—Salvatore Cangialosi
*Attorney, Agent, or Firm*—Fliesler, Dubb, Meyer & Lovejoy

[57] ABSTRACT

A machine system for automatic decryption of confidential file data on a per-use basis and automatic later elimination of the decrypted data by scorching and/or re-encrypting is disclosed. The system can operate within a multi-threaded environment. The following features are provided for secure and automatic recryption: (1) use of file-exclusion lists; (2) use of application-program exclusion lists; (3) decrypting as needed in response to intercepted file-OPEN requests; (4) encrypting as needed in response to intercepted file-CLOSE requests; (5) delaying post-CLOSE encryption in special cases; (6) delaying retry of failed encryption; (7) keeping track of the number of application programs that are using each piece of decrypted plaintext; (8) identifying non-confidential files according to the directories they are contained within; (9) including encryption and decryption rules within directories that contain confidential files; and (10) avoiding unnecessary encryption of non-modified plaintext.

13 Claims, 15 Drawing Sheets

305

LINKED LISTS (EXCLUSION & SPECIAL APPS)

309

LINKED LISTS (SECURED DIRECTORIES LIST)

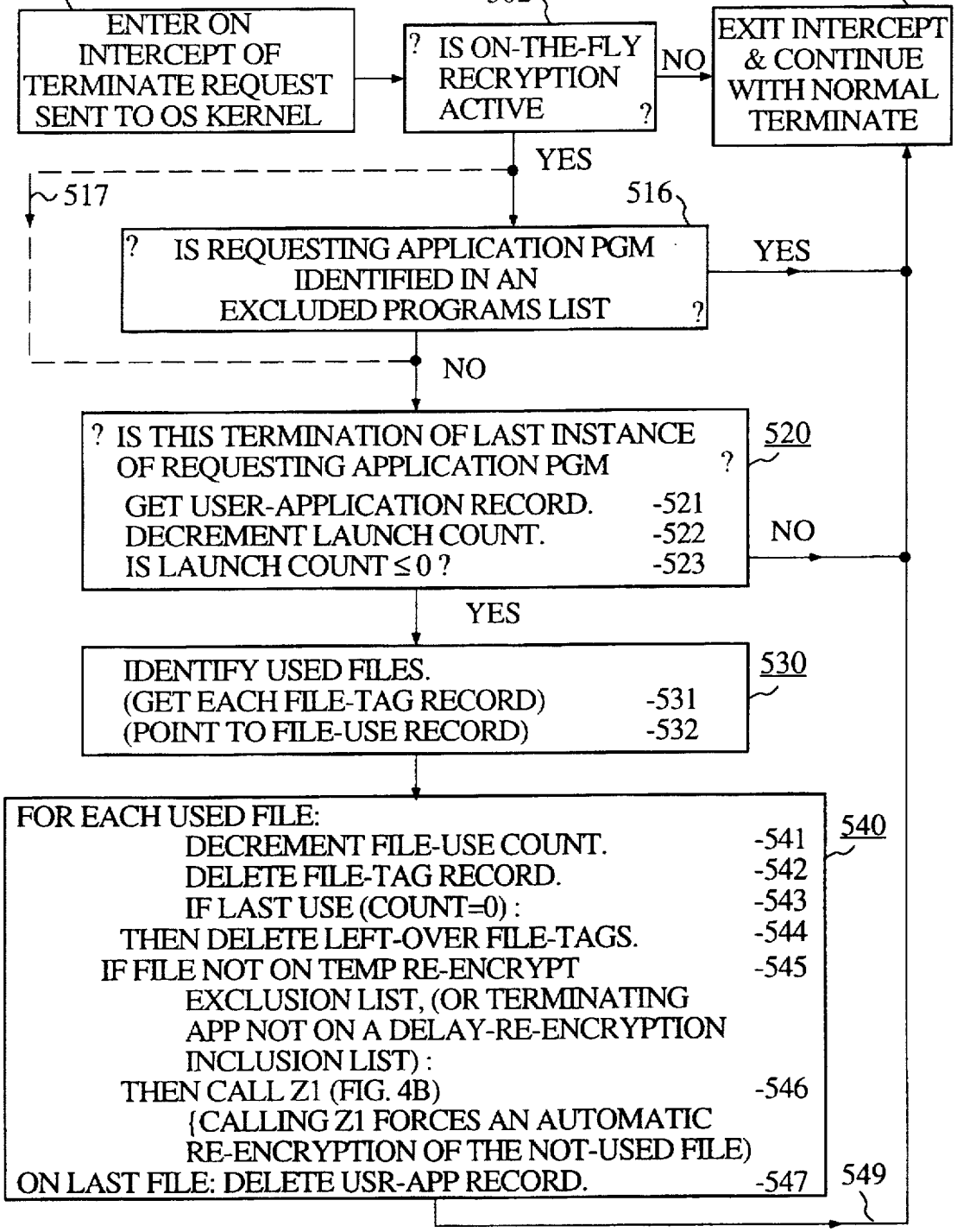

MULTI-THREADED FLOWCHART FOR RECRYPTION PROCESS

MULTI-THREADED FLOWCHART FOR RECRYPTION PROCESS (CONT'D)

SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL-TIME

This is a divisional of Ser. No. 08/586,511, filed Jan. 16, 1996, now U.S. Pat. No. 5,699,428.

BACKGROUND

1. Field of the Invention

The invention relates generally to the field of securing stored digital data from unauthorized use.

The invention relates more specifically to the problem of providing an easily usable computer system that provides features such as automatic data decryption and automatic data re-encryption while operating within the context of an operating system under which application programs run in real-time.

2a. Cross Reference to Related Pending Applications

The following copending U.S. patent application(s) is/are assigned to the assignee of the present application, is/are related to the present application and its/their disclosures is/are incorporated herein by reference:

(A) Ser. No. 08/518,191 [Attorney Docket No. SYMA1012] filed Aug. 23, 1995 by Leo Cohen and entitled, SUBCLASSING SYSTEM FOR COMPUTER THAT OPERATES WITH PORTABLE-EXECUTABLE (PE) MODULES now pending.

2b. Cross Reference to Contemplated Future Applications

The following U.S. patent application(s) were not copending at the time of filing of the present application, but were being contemplated for filing at that time, and are cited here for future back reference:

(B) Ser. No. 08/642,217 [Attorney Docket No. SYMA1018] filed [not concurrently herewith] by Shawn Lohstroh et al and initially entitled, CRYPTOGRAPHIC FILE LABELING SYSTEM FOR SUPPORTING SECURED ACCESS BY MULTIPLE USERS now pending.

2c. Cross Reference to Related Patents

The disclosures of the following U.S. patent(s) is/are incorporated herein by reference:

(A) U.S. Pat. No. 5,481,701 issued Jan. 2, 1996 to Lloyd L. Chambers IV, and entitled, METHOD AND APPARATUS FOR PERFORMING DIRECT READ OF COMPRESSED DATA FILE.

3. Description of the Related Art

As knowledge of computers; and as use of computers and of digital data proliferates throughout society, the threat grows that unauthorized persons will gain useful access to confidential, digitized information.

A wide variety of materials may be stored in the form of digitized data and there may be many legitimate reasons for keeping in confidence, the information represented by such stored data.

By way of example, stored digital data may represent medical records of private patients. The latter records may be stored as digital data in a hospital's database computer. Each patient may wish to have his or her medical records kept in confidence by a selected one or more doctors. However, the hospital's database computer may be connected to a local or wide area communications network (LAN or WAN) so that a remotely located physician or another authorized person can quickly access the medical record of a particular patient when needed, such as in the case of a medical emergency.

For the above example, one or more security measures should be taken to maintain the expected confidentiality of the medical records by blocking unauthorized persons from gaining useful access to these medical records.

There are many other instances where security is desired. By way of further example, the to-be-kept confidential information may include private business, and/or private financial, data and plans that are digitally recorded internally within a portable (e.g., laptop) computer or on a portable disk or tape. The to-be-kept confidential information may constitute legitimate trade secrets of a company, including proprietary vendor and customer lists, technical drawings and other expressions of technology know-how digitally recorded on a computer-readable medium (e.g., on a magnetically and/or optically encoded digital tape or digital disk and/or in nonvolatile random access memory).

Unauthorized access to the media that stores the data representing such digitized information or to the data itself may come about in many ways.

A floppy diskette having the confidential information digitally recorded thereon may fall into the hands of a person who is not authorized to have such information. Such physical possession of the floppy diskette may come about either through deliberate misappropriation or by accident.

An unauthorized person may alternatively gain physical entry, either lawfully or unlawfully, into a room in which a computer terminal has been inadvertently left turned on with the last user still being 'logged-on' or otherwise having access rights as far as the operating system (OS) is concerned. If appropriate security measures are not automatically invoked in such circumstances, the unauthorized intruder may be able to gain access to confidential data through the left-on terminal.

Unauthorized access may be otherwise achieved through a local or wide area network (LAN or WAN) by someone who chances upon a user's password.

In each of these or like cases, where an outer ring of security can be breached, it is desirable to maintain at least one more barrier to useful acquisition of the digitized information. To this end, many data security systems rely in part or in whole on file data encryption.

The idea is to keep confidential information in an exclusively encrypted format as much as possible so that, even if the digitized data falls into the wrong hands, it is still secured by a private encryption key.

Unfortunately, useful information is rarely kept in the encrypted state forever.

Sooner or later, an authorized user has to decrypt the encrypted file data in order to use its data. During this time of legitimate use, the safeguard of encryption is defeated.

If any plaintext copies of the file data are left intact, rather than being re-encrypted or fully destroyed immediately after use; for whatever reason, the encryption barrier remains defeated and the security of the system is undermined.

Similarly, if a new file containing confidential information is created by an authorized user, and that newly created file or any copy of it is left in a plaintext form, for example because the user forgot to encrypt the new file data, the security of the system is again undermined.

One previously-known security system requires users to manually invoke the file encryption, decryption and re-encryption functions. This approach has the aforementioned drawbacks that a user may forget to encrypt a new file or to re-encrypt a decrypted file after use, thereby undermining the encryption barrier of the security system.

The manual-invoke approach has the additional drawback of burdening the user with the tasks of manually invoking the encryption, decryption and re-encryption functions in the proper order and with the proper keys each time a file is newly created and thereafter accessed.

Users tend to avoid burdensome steps such as these even if the users understand and remember the need for vigilant encryption of the data. One excuse might be: "I'll be away from my terminal for just a few minutes and then I will continue using this plaintext data. So why should I bother with the arduous tasks of encrypting it and soon thereafter decrypting it?" Then, of course, due to unexpected occurrences, the few minutes become many hours or longer periods of time, and the security of the system is compromised.

A second, previously-known security system automatically decrypts all of a given user's files when that user logs-on to the computer system and automatically encrypts all of a given user's files when that user logs-off or when that user is forced out of the system by normal administrator action. This approach has the advantage that the user is not burdened with the tasks of remembering and of manually invoking the encryption, decryption and re-encryption functions. This second approach has the disadvantage, however, of leaving all of the given user's files in the unsecured 'plaintext' form during the time that the user remains logged-on; which can be quite a long time (e.g., eight hours). Also, if the system does not go through a normal shutdown procedure (e.g., because of an emergency power outage), all of the given user's files remain in the unsecured 'plaintext' form for an indefinite length of time. Moreover, if the user has a large number of large files, decryption and re-encryption of all such files (including those that are never used during the session) may take unacceptably long periods of time to complete.

A better approach is to automatically invoke the encryption, decryption and re-encryption functions on an as-needed basis so that the amount of information left in the 'clear' (in the unsecured 'plaintext' form) is minimized and the length of such 'in-the-clear' time is also minimized.

This is easily said. The technical problems, however, include questions such as: How does the machine system automatically determine if and when encryption, decryption or re-encryption of the data of a particular one or more files is needed? How does the machine system carry out such functions without disadvantageously reducing the performance speed of real-time application programs? How are these functions carried out within the context of an operating system (OS), especially a multi-threaded OS? What happens if the system administrator wishes to access secured files for backup or other administration related purposes?

A third, previously-available security system answers some, but not all of these concerns. This third, previously-available security system is known as SAFE™ (Secure Access Facility for the Enterprise™) and is available from Symantec Corp. of California.

The SAFE™ system operates only within a single-threaded MS-DOS™ or MS-Windows™ environment (both of the latter being trademarked products of Microsoft Corp. of Redmond, Wash.).

The SAFE™ system maintains a so-called 'opened secured-files list' on which there is recorded a list of all files that have been opened and for whose data automatic decryption is to be carried out after each corresponding DOS READ operation and for which re-encryption is to be carried out before each corresponding DOS WRITE operation.

The SAFE™ system first intercepts program calls to the DOS file-OPEN function using a well known system-call thunking procedure. On opening of the corresponding file, the opened file's name is tested against a predefined, 'encryption rules file' to see if the opened file's name satisfies a predefined rule and thereby indicates that its file does or does not belong to a predefined class of encrypted files. For example, the 'encryption rules file' may define all file names satisfying the specification, '*.doc' as falling within the encrypted class, where '*' is the well-known MS-DOS™ wildcard specifier and '.doc' is the MS-DOS™ extension part of the file name. The 'encryption rules file' has to be manually created.

If the opened file is found to belong to the encrypted class (e.g., because it has the '.doc' extension in its file name), the name of that opened file is added onto the 'opened secured-files list'. Thereafter, the SAFE™ system intercepts all program calls to the DOS file-READ and file-WRITE functions, again using a well known system-call thunking procedure. The 'opened secured-files list' system is inspected during the thunking of each DOS file-READ or DOS file-WRITE function to see if the file's name appears on the list. If it does, the corresponding decryption or encryption of the accessed file portion is then carried out.

On file-CLOSE, the name of the file is removed from the 'opened secured-files list'.

DOS functions such as file-READ and file-WRITE are called upon rather frequently. One drawback of the SAFE™ system is that its 'opened secured-files list' is searched each time a DOS file-READ or file-WRITE function is called, irrespective of whether the files being worked with are or are not of the encrypted type. This steals processor time away from executing application programs and can, in some instances, noticeably slow down the execution speed of programs that frequently use the DOS file-READ or file-WRITE functions.

Another drawback of the SAFE™ system arises from the fact that each to-be-secured file must be positively listed in its 'opened secured-files list'. If a file name is inadvertently left off the list, that file escapes the automatic decrypt and re-encrypt functions of the SAFE™ system and the security of the system is thereby compromised. (A file may be inadvertently left off the 'opened secured-files list' for example, because of an error in the manually created 'encryption rules file'.)

Yet another drawback of the SAFE™ system arises from the fact that encryption always takes place at the time of the corresponding file-WRITE. The encryption process may be relatively complex and may undesirably consume significant processor time and/or other system resources at the time of the file-WRITE.

Moreover, if the application program that invoked the just-completed file-WRITE is not yet finished using that file section (e.g., because it will soon issue a file-READ request for access to the same, just-encrypted and recorded section), then significant time and system resources may be wasted for uselessly encrypting that file section and shortly thereafter decrypting that same section.

Similarly, if a closely related second application program will soon want to use that just-encrypted file section (e.g., because the output of the file-WRITE-ing first application is being piped into the second application, such as in the command structure, 'app.1!app.2'), then time and system resources may again be wasted for uselessly encrypting that file section when the first application performs the WRITE and shortly thereafter decrypting that same section when the second application issues its READ request.

SUMMARY OF THE INVENTION

The invention provides an improved, machine-implemented method and apparatus for automatic decryption of file data on a per-use basis and automatic, optionally-delayed, re-encryption within the context of a multi-threaded operating system under which applications run in real-time.

Various features in accordance with the invention are listed below.

(1) Encrypt/Decrypt/Re-encrypt Exclusion Lists for Files

One feature in accordance with the invention is that one or more Exclusion Lists are preferably employed for automatically invoking the encrypt/decrypt/re-encrypt functions instead of a corresponding Inclusion List.

Files that are NOT named in an 'Exclusion List for (or of) Files' (where such unnamed files optionally, further satisfy some other criteria listed below), are automatically encrypted upon creation and thereafter automatically decrypted and re-encrypted on a per-use basis in response to access requests from authorized sources.

Use of an Exclusion List means that a file cannot be inadvertently left off the list such that it escapes the protection of automatic encryption followed by automatic decryption and re-encryption on an as needed basis.

There are two basic kinds of Exclusion Lists, permanent and temporary.

Specific files or classes of files that are never to be encrypted are listed in a Permanent Exclusion List of Files (PELOF, also known as a 'Never-Encrypt List'.)

Sometimes it is desirable to temporarily but not permanently exclude a specific file or class of files from the automatic decrypt and re-encrypt process. An example is if a file is to be attached to an e-mail message packet in its encrypted format for transmission as an encrypted message. In such a case, the file may be listed in an appropriate, 'Temporary Exclusion List of Files' (TELOF) and would be later removed from that TELOF list upon the occurrence of a predefined event (e.g., termination of a secured transmission procedure).

Another example of where a temporary exclusion list may be used is the case where file data is being copied to a backup medium such as backup tape. In such a case it is neither necessary nor desirable to decrypt the file before that file is copied to the backup medium, and as such, the names of all files that are being backed up can be temporarily posted onto a temporary exclusion list.

One further, but important example of where a temporary exclusion list may be used is for excluding from automatic encryption, decryption and re-encryption, the so-called 'scratch' files that are created by the operations of the automatic encryption, decryption and re-encryption procedures. (The automatic encryption, decryption and re-encryption procedures are otherwise, collectively, referred to herein as 'on-the-fly recryption' or 'OTF recryption'.)

If, within 'on-the-fly recryption', each creation of a scratch file were allowed to itself automatically invoke another level of OTF encryption, decryption and re-encryption, then an endlessly recursive process may undesirably develop within the machine. To prevent this from happening, scratch files that are created or opened by the operations of the OTF recryption procedures may be listed on an 'On-the-fly Temporary Exclusion List' (OTEL).

(2) Recrypt Exclusion Lists for Special Application Programs

A second feature in accordance with the invention deals with excluding from 'on-the-fly recryption' (from the automatic encryption, decryption and re-encryption procedures) those file access requests that are attributed to special application programs, such as backup programs, where use of the file can be constrained entirely to its encrypted form. A permanent or temporary, exclude from 'on-the-fly recryption' list for programs can be created to correspondingly exclude on a permanent or temporary basis, from automatic recryption all files accessed by the listed special application programs without specifically listing those files. This is an alternative or supplement to using one of the Exclusion Lists for Files.

(3) Intercept File-CLOSE and File-OPEN Requests

A third feature in accordance with the invention is that first-time file encryption, and subsequent file re-encryptions, are preferably performed in response to intercepted and corresponding file-CLOSE requests rather than in response to each intercepted and corresponding file-WRITE request.

Similarly, file decryptions are preferably performed in response to intercepted and corresponding file-OPEN requests issued by an authorized source (e.g., an authorized user) rather than in response to each intercepted and corresponding file-READ request.

The File-CLOSE and file-OPEN requests are generally issued less frequently to an operating system than are the file-WRITE and file-READ requests. As a consequence, the decision making process (of whether to decrypt or re-encrypt) is invoked less frequently, and more importantly, the time and resource-consuming processes of decryption and re-encryption are also performed less frequently. As a general rule, this has less of a negative impact on system performance speed than does automatic (but selective) decryption and re-encryption in response to each respective file-READ and file-WRITE request.

A further facet of the second feature of the invention is that interception of file-CLOSE and file-OPEN requests can be carried out not only for single-threaded operating systems such as MS-DOS™ or MS-Windows™, but also for multi-threaded operating systems such as Windows95™ (the latter also being a trademarked product of Microsoft Corp. of Redmond, Wash.). To that end, the technique disclosed in the above-cited U.S. patent application Ser. No. 08/518,191, entitled, SUBCLASSING SYSTEM FOR COMPUTER THAT OPERATES WITH PORTABLE-EXECUTABLE (PE) MODULES is employed to intercept calls to kernel services such as the file-CLOSE and file-OPEN functions of the Win32 kernel in Windows95™ or a another like multi-threaded operating system.

(4) Delayed Post-CLOSE Encryption and Re-encryption

A fourth feature in accordance with the invention is that, for files accessed by 'Special-Use' application programs identified in a 'Special-Use Applications List', the first-time file encryption and subsequent file re-encryptions are preferably performed in delayed response to the intercepted and corresponding file-CLOSE requests.

The delayed response preferably occurs on interception of an application-program termination message from such a listed 'Special-Use' application program. To this end, a 'Special-Use Applications List' is recorded and consulted by the machine.

Some application programs open and work on many files simultaneously or over long periods of time. These application programs may close and re-open a given one or more of their many files, numerous times. The execution speed of such programs may suffer if file encryption and/or re-encryption is carried out at the time of each file-CLOSE request.

Accordingly, if a file is designated as being 'in use' by an application program listed in the 'Special-Use Applications List', post-CLOSE encryption or re-encryption is delayed until the last such file-using application terminates and then the post-CLOSE delayed encryption or re-encryption is constrained to being carried out just one time (despite the fact that there may have been many closing requests for such a file).

(5) Delayed Retry of Failed Encryption and Re-encryption

A fifth feature in accordance with the invention has to do with the timing of when the file encryption procedure makes a file access request to the operating system in order to encrypt a given file.

If the requested file is designated as being still 'in use' by another program, the OS will generally reject the file access request made by the file encryption process. As such, the attempted file encryption will fail and the file may escape the protection afforded by automatic encryption.

To avoid such an undesirable consequence, provisions are made for intercepting the OS message respecting the failed encryption attempt and for re-posting to a tasks-list, a new request to encrypt the same given file at a later time. In one embodiment, the re-posting of such a new request is delayed until all programs that have designated the subject file as being under their 'use' have terminated.

(6) File-Use Count in File Encryption/Re-encryption Control Record

A sixth feature in accordance with the invention has to do with the possibility that numerous application programs may access a given file at the same time (for example, with all such multiple simultaneous accesses being of the READ-only kind).

If one of these file-using application programs issues a file-CLOSE request well before the same is done by any of the other application programs that are still using the same file, it would be disadvantageous to encrypt that file in response to the first closing program. The other programs would be cut off from continued access to the decrypted information of that file.

In accordance with the invention, a File-use Control Record (FCR) is created for each new file that is opened and is subject to the possibility of subsequent encryption. Each File-use Control Record (FCR) includes a File-Use Count field whose count value is incremented each time a file-OPEN request is intercepted for that same file from a file-using application program. The count value in the File-Use Count field is decremented each time a file-CLOSE request is intercepted for that same file from a file-using application program. File encryption or re-encryption is delayed until the count value in the File-Use Count field is decremented to zero, meaning the last of the multiple, file-using application programs has finished using that file.

(7) List of Secure or Non-secured Directories

A seventh feature in accordance with the invention deals with the practical consideration that it may be disadvantageous to encrypt, decrypt and re-encrypt certain kinds of files, such as frequently-used executables.

Rather than identifying each such file individually, by posting the specific file name in an Exclusion List of Files (to a PELOF or to a TELOF), the to-be-excluded files are preferably identified in accordance with what directory or chain of subdirectories they are, or are not, immediately or hierarchically 'contained' within.

When a corresponding file-OPEN request is intercepted, a pre-created list of 'Secured Directories' (or alternatively a pre-created list of 'Non-secured Directories') is consulted.

If the pathname of the to-be-opened file is the same as (or includes) a directory identified in the 'Secured Directories List', the interception procedure enables first-time encryption or decryption and subsequent re-encryption for that file.

Alternatively or additionally, if the pathname of the to-be-opened file includes a directory identified in a 'Non-secured Directories List', the interception procedure disables first-time encryption or decryption and subsequent re-encryption for that file.

(8) Rule-based Encryption and Decryption

An eighth feature in accordance with the invention concerns the selection of the specific encryption and decryption algorithm to be applied to each file.

There are many types of encryption algorithms and counteracting decryption algorithms. Encryption algorithms may be of a data compressive or noncompressive type. The encryption algorithm may be block-oriented (such that of chunks of data of limited length are individually encrypted without reliance on other chunks) or file extensive (such that most or all of the data of the to-be-encrypted file is used for encrypting each portion of that file).

Examples of commonly used encryption algorithms include: the Data Encryption Standard (DES), RSA RC4™ (available from RSA Data Security, Inc.) and Blowfish.

A good security system uses a gamut of encryption algorithms and encryption keys so that the compromise of one does not compromise the security of all files. Also, some encryption and/or decryption algorithms may execute faster than others such that there may a speed reason for choosing one over another. Some algorithms may be more field-use proven than others. An intended, off-system recipient of a secured message may have access to some but not all on-system algorithms or keys. It may be necessary to decrypt a message out from under one algorithm/key and re-encrypt the message under another algorithm and/or key that the recipient has before sending the encrypted ciphertext out to the intended recipient. Management of different encryption algorithms, and encryption keys, and corresponding decryption keys is a problem.

In accordance with the invention, for each secure directory identified in the 'Secured Directories List', a hidden 'Recryption Rule File' is stored within the listed directory. The 'Recryption Rule File' may be used for defining for the 'on-the-fly recryption' routines a variety of important rules, such as: (a) which user or class of users is authorized to decrypt secured files within that secured directory; (b) what type of encryption algorithm has been used to encrypt the secured files stored within that secured directory; (c) what algorithm is to be employed to obtain a decryption key for each specific file within that secured directory. Each secured directory can have its own unique 'Recryption Rule File' defining a correspondingly unique set of authorized users, a correspondingly unique encryption and decryption algorithm, and decryption-key specifying rules.

(9) Rename of Previously Encrypted (Old) File

A ninth feature in accordance with the invention deals with bypassing unnecessary re-encryption of data where a properly encrypted copy already exists.

Rather than decrypting an originally encrypted file upon the intercept of a file-OPEN request, the originally encrypted file is renamed and a copy of the file is created under the original file name. The copy is decrypted while the renamed original remains intact. Then, if no changes are made to the decrypted copy between the file-OPEN request and final file-CLOSE request, the decrypted copy is 'scorched' (erased to a desired level of effectiveness) and the renamed original file is again renamed, this time back to its original name. If changes have been made to the decrypted copy between the file-OPEN request and final file-CLOSE request, the renamed original is scorched and the modified copy is encrypted.

Other features and aspects of the invention will become apparent from the below detailed description.

BRIEF DESCRIPTION OF THE DRAWINGS

The below detailed description makes reference to the accompanying drawings, in which:

FIG. 5 is a third flow chart showing how a program-TERMINATE intercept operates in accordance with the invention;

DETAILED DESCRIPTION

Figure 1:
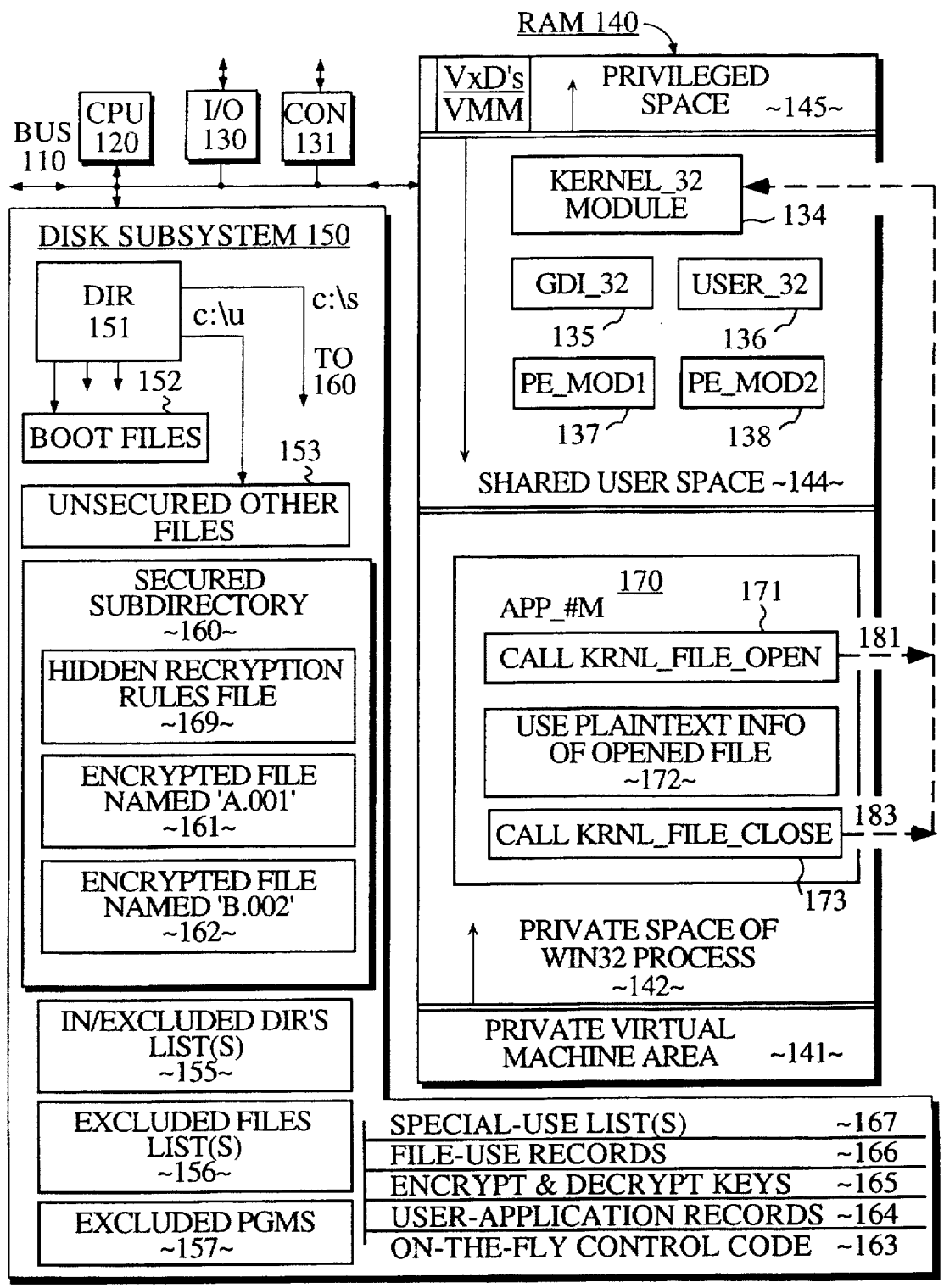
FIG. 1 is a block diagram of a computer system in accordance with the invention.

FIG. 1 is a block diagram of a computer system 100 that may be used in accordance with the invention. Computer system 100 includes a system bus 110 coupling a system memory 140 such as a random access memory (RAM) to a plurality of other system resources including a system CPU 120, system I/O 130, an intersystem data conveyance means 131, and a nonvolatile disk subsystem 150.

The system memory 140 may comprise assorted types of high-speed random access devices into which immediately executable code may be stored. System memory 140 can include one or more of static RAM (SRAM), dynamic RAM (DRAM), and other like devices. Typically at least part of the system memory 140 is volatile, meaning data is lost and must be rewritten when power is lost, although it is not outside the contemplation of the invention to have system memory 140 defined by non-volatile random access memory devices such as flash EEPROM. Often the computer system 100 will include a small boot ROM (Read Only Memory, not shown) coupled to the CPU 120 for power-up and other basic re-bootings of the system.

When system 100 boots-up, various files are automatically loaded from the disk subsystem 150 or from elsewhere (e.g., from system I/O 130) into system memory 140 to thereby create a collection of data structures within system memory 140. These data structures normally include executable instruction code that can be immediately and usefully executed by a responsive data processing unit such as the illustrated central processing unit (CPU) 120 of FIG. 1 or by non-centralized multiple data processing units (not shown) that may be further or alternatively coupled to bus 110.

The system I/O module 130 uses bus 110 for transferring data between one or more of the illustrated portions of system 100 and external devices. In one embodiment, the system I/O module 130 may couple the illustrated system bus 110 to a variety of external resources such as a user terminal (e.g., keyboard and monitor), a local area network (LAN), a wide area network (WAN) and/or to other external data transceiving and processing means.

The data conveyance means 131 can be defined by data transfer devices such as floppy diskette drives, tape drives, CD-ROM drives and other such means by which data recorded on transportable media can be brought into system 100 or copied and carried away from system 100.

The disk subsystem 150 typically includes a drive (not separately shown) and a data storage medium (not separately shown) onto which data may be stored and from which data may be retrieved. The disk data storage medium may be in the form of a magnetic hard disk, or a floppy diskette, or a re-writable optical disk, or other such non-volatile, randomly accessible, re-writable media. ROM or Flash EEPROM may be alternatively used in carrying out some or all of the nonvolatile data storing functions of the disk subsystem 150.

Data is recorded on the disk subsystem 150 to define a directory structure 151 and a plurality of files (not all shown) such as automatic boot-control files 152, and other files such as 153. The group of files referenced as 153 are referred to herein as unsecured other files 153 for reasons that will become apparent shortly.

Directory structure 151 points to, and defines the storage organization of each of the stored files. By way of example, the boot-control files 152 may be defined as being contained in a root directory (such as c:\ in MS-DOS™ parlance). The unsecured other files 153 may be defined as being contained in a first subdirectory (such as c:\ in MS-DOS™ parlance). Yet other files such as the illustrated files 161 and 162 may be defined as being contained in a second subdirectory 160 (such as c:\s in MS-DOS™ parlance).

The illustrated second subdirectory 160 is referred to herein as a secured subdirectory 160 for reasons that will become apparent shortly. One or more of the files such as 161 and 162 that are contained in the secured subdirectory 160 are referred to herein as secured or encrypted files.

The secured subdirectory 160 may contain other types of files such as the illustrated, 'hidden' recryption rules file 169. The term 'hidden', means here that the recryption rules file 169 is not listed when a simple list-directory-contents command such as DIR (in MS-DOS™ parlance) is executed.

Although not shown, the secured subdirectory 160 may contain plaintext file copies derived from one or more of its encrypted files, 161–162 by way of decryption.

As further seen in FIG. 1, disk subsystem 150 stores: (a) one or more lists 155 identifying directories whose non-hidden files are to be included or excluded from 'on-the-fly recryption'; (b) one or more lists 156 identifying files that are to be excluded from OTF recryption; (c) one or more lists 157 identifying 'to-be-excluded' file-using programs for which OTF recryption is to be suppressed; (d) one or more lists 167 identifying 'special' file-using programs or 'special' files for which the re-encryption portion of 'on-the-fly recryption' is to be delayed until after a prespecified post-CLOSE event takes place; (e) one or more File-Use records 166 for keeping track of which still-decrypted file copies are still using by which application programs; (f) a collection 165 of encryption and decryption keys and algorithms; (g) a set 164 of User-Application records for keeping track of how many instances of each application program are still using a given, decrypted file or decrypted file-copy; and (h) instruction code 163 for instructing the CPU 120 (or a like processor means that is operatively coupled to the system bus 110) to carry out 'on-the-fly recryption' (OTF recryption) in accordance with the herein described invention.

Although not expressly shown in FIG. 1, it is to be understood that aside from the on-disk exclusion and/or inclusion lists, the OTF instruction code 163 can be constructed to permanently define certain classes of files such as executables (e.g., '*.exe', '*.com', etc.) and dynamic link-loadables (e.g., '*.DLL') as being permanently excluded from OTF recryption.

Although further not shown in FIG. 1, it is to be understood that disk subsystem 150 can store many other types of data structures, including but not limited to: (aa) device drivers (e.g., the 'virtual device drivers' or VxD's shown in area 145 of system memory 140); (bb) a disk-image of an OS kernel module (KRNL32.DLL, whose RAM-resident image is shown at 134 in area 144 of system memory 140); (cc) a disk-image of a graphical device interface module (GDI32.DLL, whose RAM-resident image is shown at 135); (dd) a disk-image of a user interface module (USR32.DLL, whose RAM-resident image is shown at 136); (ee) and further disk-images of other link-loadable modules (e.g., PE_MOD1.DLL, PE_MOD2.DLL, APP#M.EXE, whose respective RAM-resident images are respectively shown at 137, 138 and 170).

All or various parts of the data recorded on the disk subsystem 150 may be brought into subsystem 150 or copied out from subsystem 150 through a variety of data conveying means 131 or I/O means 130. The latter means 131 and 130 may include but not limited to: floppy diskettes, compact-disks (CD-ROM), tape, and over-a-network downloading by a file server computer or the like.

Given that data in stored files such as encrypted files, 161–162 may become available to unauthorized users through a variety of ways (as already described above), it is desirable to keep as much of this stored data in an encrypted form (ciphertext form) except for times when it is being legitimately used by authorized users.

On the other hand, there are other kinds of recorded, nonvolatile data for which it is desirable to keep that nonvolatile data in immediately usable, non-encrypted form (plaintext form). An example of the latter is the boot-control files 152 that are used in power-up or later initialization of the computer system 100. Another example of the latter is operating system software that is frequently called upon by most of the application programs of system 100.

Power-up or later initialization of computer system 100 may proceed as follows. In the Windows95™ environment for example, an initial operating system such as MS-DOS™ resides nonvolatilely on the disk subsystem 150 and is initially loaded into system memory 140 at power-up or re-boot time. Thereafter, additional data structures are loaded into the system memory 140 using the initial system operating system (MS-DOS™) as springboard booter.

It is generally not desirable to store in an encrypted format, those files 152 that are involved with the loading of the initial system operating system (e.g., MS-DOS™). As such, the boot-controlling regions 152 of the disk subsystem 150 (which regions usually include the root directory c:\ and the automatic boot control files such as c:\autoexec.bat and c:\config.sys that are immediately contained therein) are preferably identified in an Excluded Directories List of region 155. Alternatively or supplementally, the same regions 152 are NOT identified in an Included Directories List of region 155 so as to prevent undesired 'on-the-fly recryption' of files immediately contained in such boot-control regions 152.

Alternatively or additionally, such boot-control files 152 can be identified in an Excluded Files List of region 156.

Just as it is desirable to suppress 'on-the-fly recryption' for the boot-control files 152, there may be other classes of files which are best left in an non-encrypted format on disk subsystem 150 for relatively long periods of time (e.g., for time periods substantially greater than the file usage time of any one or more application programs).

These 'unsecured other files' are referenced as 153 in FIG. 1. Often-used executable files (e.g., those having a '.exe' or '.com' extension) are an example of a file type that system administrators may wish to include in this category of unsecured other files 153.

Like the boot-control files 152, the unsecured other files 153 may be deliberately excluded from 'on-the-fly recryption' by storing them in a directory (e.g., c:\u where 'u' is arbitrarily selected here to stand for 'unsecured') that is positively identified in an Excluded Directories List of region 155 and/or by not storing them in a directory (e.g., c:\s where 's' is arbitrarily selected here to stand for 'secured') that is identified in an Included Directories List of region 155.

The boot-up of Windows95™ includes installation of virtual machine manager code (VMM code), virtual device drivers code (VxD's), Win16 operating system code, and Win32 operating system code into various privileged and nonprivileged areas of system memory 140.

In the case where one or more Win32 threads are to execute within a corresponding process (there can be more than one Win32 process running simultaneously on system 100, but each Win32 process executes in its own memory context—that is, in its own private Win32 process area), the virtual address space of system memory 140 is subdivided to include: (a) a private virtual machine area 141; (b) a private Win32 process area 142; (c) a shareable user space (global space) 144; and (d) a privileged space 145.

FIG. 1 shows the system memory 140 in a state where a virtual machine manager (VMM) has been loaded into the privileged space 145 together with one or more virtual device drivers (VxD's). The virtual machine manager (VMM) defines a privileged part of the operating system environment that application programs are supposed to—but do not necessarily—honor as being user-inaccessible. The virtual device drivers (VxD's) are operatively coupled to the VMM for responding to system status messages broadcast by the VMM.

FIG. 1 further shows the system memory 140 in a state where first RAM-resident code 134 defining a Win32 operating system kernel (KERNEL_32) has been mapped from a corresponding disk region (not shown) into the shared user space 144. Unlike the VMM, the KRNL_32 module 134 defines a nonprivileged, understood to-be user-accessible part of the operating system environment.

In the particular illustrated state of FIG. 1, after the loading of the OS kernel 134, second RAM-resident code 135 defining a Win32 graphical device interface (GDI_32) has been loaded from a corresponding disk region into a lower portion of the same shared user space 144 of memory 140. Thereafter, third code 136 defining a Win32 user interface (USER_32) has been loaded from disk into the shared user space 144. Following this, additional PE (portable-executable) modules have been loaded from various library areas (not shown) of disk subsystem 150 into the shared user space 144, such PE modules PE_MOD1 (137) and PE_MOD2 (138). Like, modules 137 and 138, each of the earlier-loaded blocks 134, 135 and 136 that reside in the shareable user space 144 has a portable-executable (PE) format and is expected to be in a non-encrypted, immediately usable form.

The module-occupied portion of the shared user space 144 generally grows downwardly from upper memory towards lower memory as indicated by the downwardly pointing arrow drawn in space 144. A preferred upload-destination address (Image_Base) is often defined within the disk-image of each PE module (134–138). In cases where free RAM space is available to accommodate the preferred upload-destination, the loader that maps disk-images of modules to RAM-resident images will try to accommodate the preference of each uploading module. However, in cases where the preferred RAM space is already occupied, the uploading module is usually instead relocated to a next-lower accommodating space in the shareable user space 144.

In the particular illustrated state of FIG. 1, after the OS kernel 134 and some other basic operating system modules such as GDI 135 and USER 136 have loaded, code for private application programs such as AP_#M (170) is shown to have been mapped from a respective disk region into the private Win32 process area 142. The module-occupied portion of the private Win32 process area 142 generally grows upwardly from lower memory as indicated by the upwardly pointing arrow drawn in space 142. Such upward expansion of used space is again carried out under the caveat that the loader tries to accommodate the upload-destination preferences defined in the module disk-images when such free space is available. Thus, in general, the specific location within private Win32 process area 142 for each next loaded private module may depend on which private modules were previously loaded or unloaded.

During the uploading of each module's disk-image into system memory 140, cross references of each uploading module that point to locations outside of their respective module are generally resolved at upload-time if they had not been resolved previously (that is, if they had not been resolved statically by link-time).

Assume that at some point in the history of system 100, the Win32-compliant, the executable application program named APP_#M, that had been stored as a non-encrypted file on the disk subsystem 150, and that had been thereafter link-loaded into subregion 170 of the private Win32 process area 142, is 'launched' such that it begins to execute.

Assume that, like many other application programs, launched APP_#M 170 is coded to access data in an external data file (say for example, a file named, 'c:\s\A.001' which filename is the name of the illustrated, encrypted file 161).

Application program APP_#M is not aware that the file stored under the name, 'c:\s\A.001' is currently encrypted. Irrespective of this, the OS-compliant attempt by application program APP_#M to access the file named, 'c:\s\A.001' will, at some level, generate a CALL to a file-OPEN service of the OS kernel (e.g., to a kernel service routine named for example, 'KRNL_FILE_OPEN') as indicated at 171. Such an interceptable call to 'KRNL_FILE_OPEN' is indicated by the drawn path 181.

As further indicated at 172, after the file-OPEN request is granted, application program APP_#M will probably try to use what it expects to be the plaintext data of the opened file by way of one or more file-READs and file-WRITEs. The corresponding calls to OS kernel services are not shown to avoid illustrative clutter.

As yet further indicated at 173, after application program APP_#M deems itself to be finished with its use of the data of the requested file 161, it will generally cause an interceptable CALL to a file-CLOSE service of the OS kernel (e.g., to a kernel service named for example, 'KRNL_FILE_CLOSE') to be generated at some level as indicated by the drawn path 183.

Although not expressly shown, when the execution of application program APP_#M completes, the OS kernel 134 will be asked to 'terminate' that application program.

In accordance with the invention, the interceptable CALL's to the file-OPEN and file-CLOSE services of the operating system are intercepted and acted upon to provide automatic and selective, 'on-the-fly recryption'. The interceptable CALL's to the program-LAUNCH and program-TERMINATE services of the operating system are also intercepted and acted upon to provide specialized handling for certain kinds of application programs.

Figure 2A:
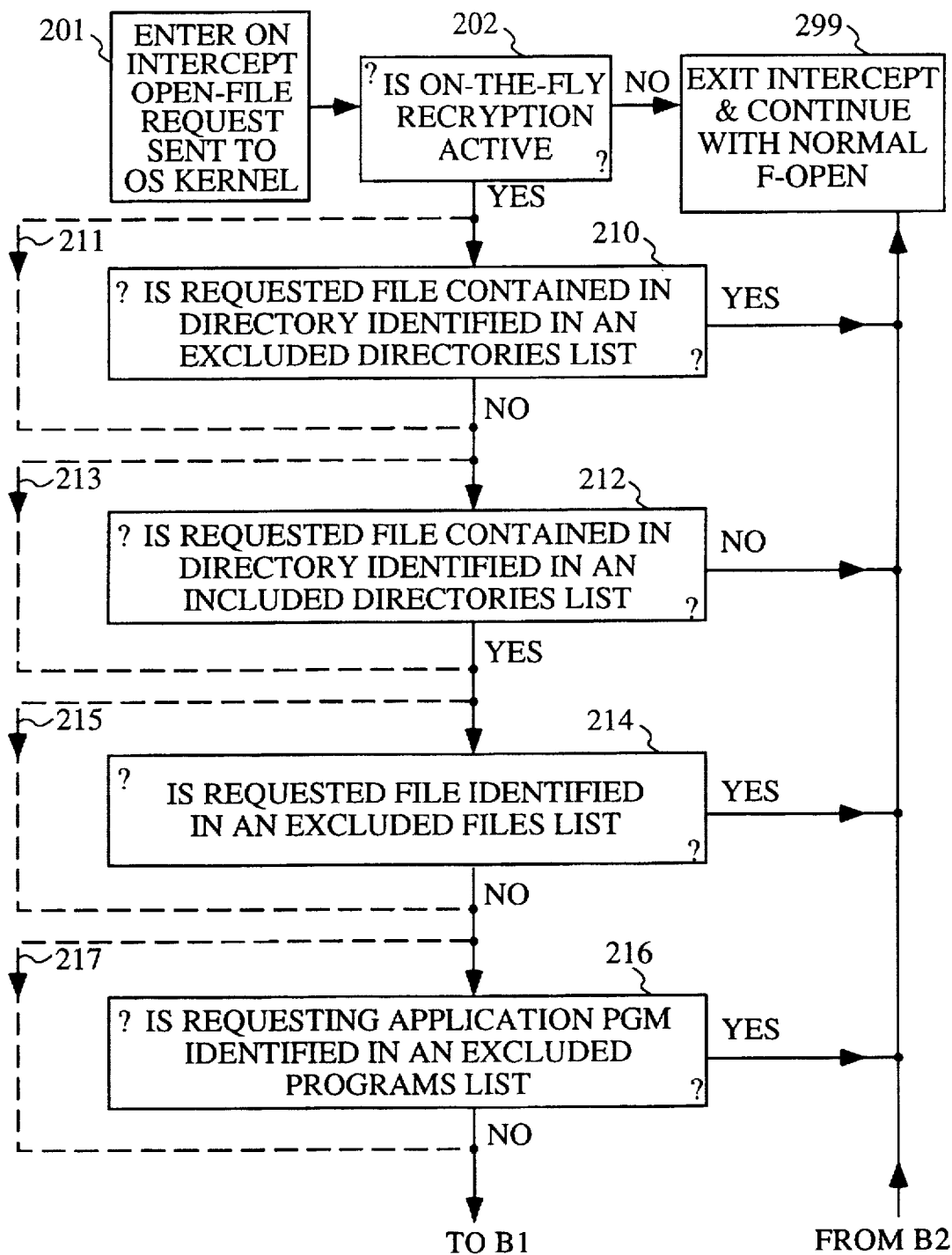
FIGS. 2A–2B form a first flow chart showing how a file-OPEN intercept operates in accordance with the invention.
Figure 2B:
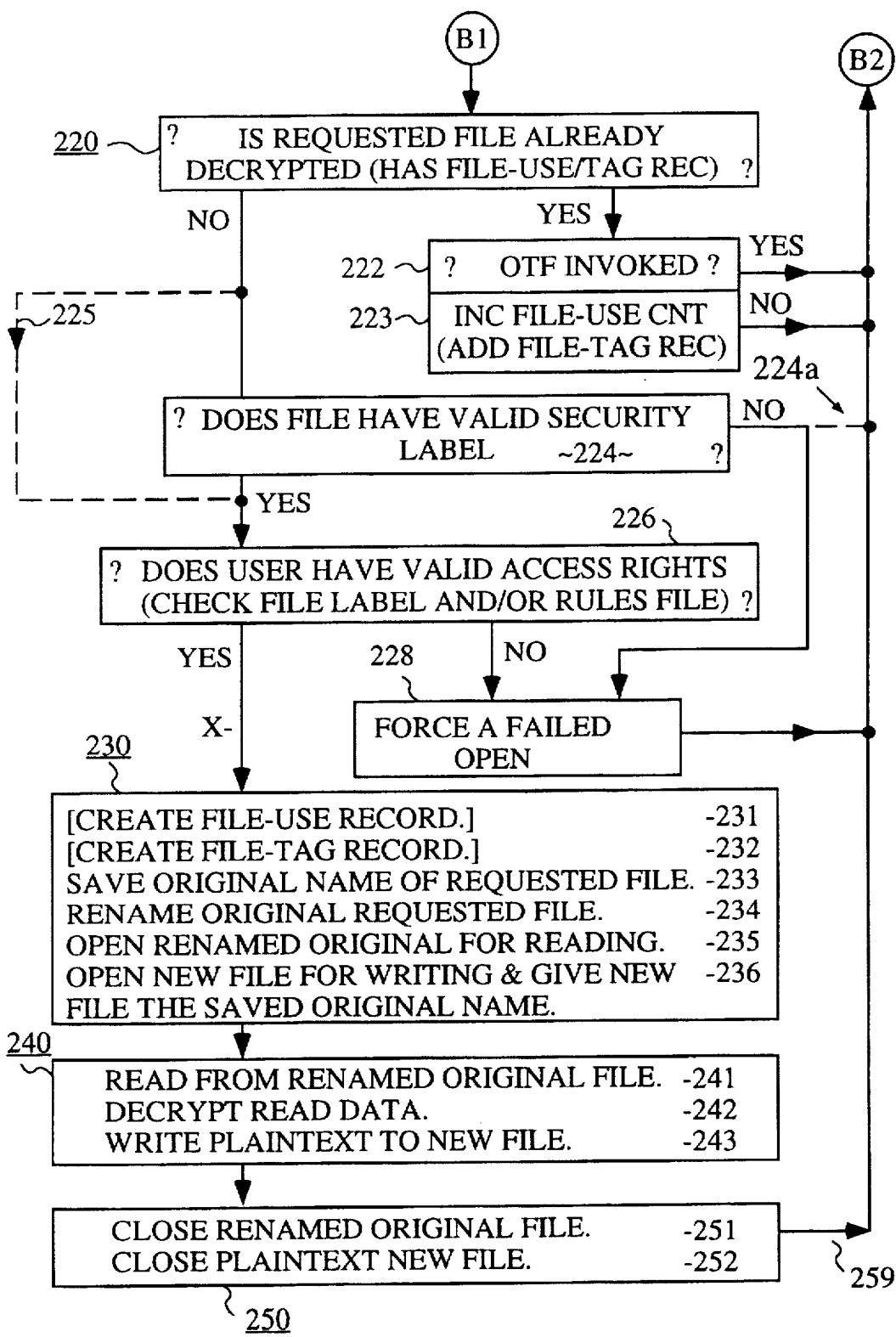

Referring to FIGS. 2A and 2B, there is shown a first flow chart depicting a machine-implemented, On-Open intercept routine 200 which is carried out upon intercept of an Open-file request made to the operating system kernel 134. The OTF instruction code 163 of disk subsystem 150 is loaded into system memory 140 for causing the CPU 120 to carry out operations implementing the functions of the On-Open intercept routine 200 as well as that of the other, below-described routines (400, 500, 600, 700). In one Win32 embodiment, part or all of the code for implementing the On-Open intercept routine 200 as well as that of the other, below-described routines (400, 500, 600, 700) is loaded into the illustrated VxD section of FIG. 1 for execution as a virtual device driver.

The On-Open intercept routine 200 is entered at step 201 upon interception of an Open-file request sent to the OS kernel. In the case where the OS kernel is a Win32 or like portable-executable (PE) module, the subclassing method disclosed in the above-cited U.S. application Ser. No. 08/518,191 may be used. If the operating system kernel is of the more traditional, single-threaded type such as employed in MS-DOS™ or Win16, then conventional thunking may be employed.

At step 202, a system global flag is checked to see if on-the-fly recryption is currently 'active'. If the answer to the 'OTF active?' check 202 is No, the intercept routine 200 is quickly exited by way of exit step 299 and control is passed back to the File-open service routine of the OS kernel so as to allow the latter to complete the normal File-open procedure without further modification or delay.

The 'OTF active?' check 202 allows system administrators to completely suppress the OTF recryption during time periods when such global suppression is desirable. For example, it may be desirable to completely turn off on-the-fly (OTF) recryption when the system is first being booted up and an initial set of non-encrypted user-executable files are being loaded into system memory 140. In one Win32 embodiment, the On-Open intercept routine 200 is defined as a virtual device driver (VxD) that automatically loads when the system boots. When this VxD 200 loads (and other VxD's 400, 500, 600, described below also load), the OTF flag is reset to 'inactive'. The remainder of the OTF instruction code 163 loads later in the process after the virtual device drivers load. One of the initialization routines in the later-loaded OTF instruction code 163 initializes the OTF flag to 'active'. If for some reason, the remainder of the OTF instruction code 163 fails to load or execute it's initialization routines, the OTF flag remains 'inactive' and the OTF VxD's 200, 400, 500, 600 are prevented from trying to interact with the faulty remainder of the OTF instruction code 163.

If the answer to the 'OTF active?' check 202 is Yes, control flows through at least one, if not all, of subsequent test steps 210, 212, 214 and 216.

One or more, but not all, of respective test steps 210, 212, 214 and 216 may be optionally bypassed by respective bypass paths 211, 213, 215 and 217. The respective bypass paths 211, 213, 215 and 217 may be permanently or contingently established according to the desires of the system administrator. The sequential order of respective test steps 210, 212, 214 and 216 may be optionally rearranged to improve performance speed if it is known that one type of check eliminates more possibilities more quickly than another. The faster, more far reaching check step would then be moved to an earlier portion of the sequential string of check steps 210, 212, 214 and 216.

At test step 210, if it is not bypassed by 211, a check is made of the Excluded Directories List(s) of memory region 155 (FIG. 1) to determine whether the requested file is 'contained' in a directory that is identified as an excluded directory (a directory whose files are not to be subjected to automatic recryption).

The term 'contained', as used in the context of the excluded-directory check step 210, can have either of two meanings. Each such meaning defines an operable embodiment of method 200. According to the first meaning, 'contained' means that the file is immediately found in the identified directory rather than in a subdirectory of the identified directory. According to the second meaning, 'contained' means that the file may be found either immediately in the identified directory or in any subdirectory along one or more chains of subdirectories having the identified directory as their parent.

If the answer to the excluded-directory check step 210 is Yes, the On-Open intercept routine 200 is exited by way of step 299 and the normal file open process is allowed to continue. If the answer is No, control is passed to test step 212 or alternatively to its bypass path 213.

At test step 212, if it is not bypassed by way of optional path 213, the Included Directories List(s) of memory region 155 (FIG. 1) are consulted to see if the requested file is 'contained' in a directory identified by the consulted Included Directories List(s). The term 'contained', as used in the context of the included-directory check step 212, can have either of the alternative meanings given above for the excluded-directory check step 210 irrespective of which meaning is chosen for step 210.

Although either of test steps 210 and 212 may be employed by itself to quickly exclude a directory-contained class of files from on-the-fly recryption, it is not outside the contemplation of the invention to use both of steps 210 and 212 rather than bypassing one of them. For example, a directory may be temporarily listed in an Excluded-directories list and may thus be temporarily blocked from having its 'contained' files automatically recrypted even though the same directory or a subdirectory thereof is permanently listed on an Included-directories list that is consulted at step 212.

If the answer to the included-directory check step 212 is No, control returns to step 299. If the answer to test step 212 is Yes, control passes either to test step 214 or its corresponding bypass path 215.

At test step 214, if its bypass path 215 is not optionally taken, the Excluded Files List(s) of memory region 156 (FIG. 1) are consulted to see if the requested file is identified in at least one excluded-files list of region 156 (FIG. 1). The excluded-files lists of region 156 can include a so-called permanent exclusion list of files (PELOF, otherwise known as the 'Never-Encrypt List') and/or one or more of the so-called temporary exclusion lists of files (TELOF's). The file-identifications made in each TELOF can be cleared en masse or selectively in response to various and corresponding events within or outside of system 100. For example, one TELOF may be automatically cleared of all its identifications at periodic intervals, such as once every hour or once a day. Another TELOF may be automatically cleared each time a prespecified application program terminates. And so forth.

If the answer at the excluded-file check 214 is Yes, then control passes to exit step 299. If the answer is No, control passes to test step 216, or optionally to its bypass path 217.

At test step 216, if it is not bypassed by path 217, the Excluded Programs List of memory region 157 (FIG. 1) is consulted to see if the requesting application from which the present Open-file request evolved is listed or otherwise identified in such an Excluded Programs List.

If the answer at the excluded-program check step 216 is Yes, the intercept routine 200 is exited by way of step 299. If the answer is No, control passes to step 220 (FIG. 2B) by way of connection B1.

At test step 220, it is determined if a decrypted version of the file has already been created.

In one embodiment of step 220, the File-Use records region of memory 166 (FIG. 1) is scanned to see if a decrypted version of the file has already been created. In that embodiment, if a decrypted version of the file has already been created, a File-Use record should have been created for that file. (See below step 231 and also FIG. 3A.)

In the same or another embodiment, a File-Tags list within memory (e.g., 385, 388, 390 of FIG. 3C) is further or alternately scanned to see if a decrypted version of the file has already been created and opened due to an earlier request of the now-requesting application program. In that embodiment, if a decrypted version of the file has already been created because another application program had earlier requested access to the file, a File-Tag record should have been created for linking that file with the earlier in time, other application. (See below step 232 and also FIG. 3C.)

In the embodiment that employs both File-Use records and File-Tag records (see FIG. 3C), a File-Tag record should be created for linking the identity of each 'using' application program (User-application) with the identity of each plaintext, decrypted file that is to be considered 'in-use' by that specific User-application. If for some reason, it is found within step 220 that a File-Use record exists, but there is no File-Tag record yet created for linking the current application program that is requesting a file-OPEN (or more specifically, for linking the corresponding User-application record) with the File-Use record of the to-be-opened file, such a File-Tag record is now created within step 220 (or alternatively, shortly after in step 223).

Moreover, if it is further found within step 220 (for the embodiment that employs both File-Use records and File-Tag records) that a User-application record (e.g., 382 of FIG. 3C) has not yet been created for linking the identity of the currently 'requesting' application program with the earlier-formed plaintext, decrypted file; such a User-application record is now created in step 220 (or alternatively, shortly after in step 223) and linked to the corresponding File-Tag record.

If the answer to the plaintext-available? test 220 is Yes, control passes to test step 222 where it is determined if the current file-OPEN request issued at the behest of an OTF recryption module. In one embodiment, each File-Use record 300 has a state-tracking section 320 that indicates if an OTF module is currently processing the to-be-opened file. If it is (if OTF_Invoked? is true), then step 223 is bypassed and the On-Open intercept routine 200 is exited via step 299 as indicated.

If OTF_Invoked? is false (No), then in following step 223 a File-use Count (e.g., field 331 of FIG. 3A) is incremented. The File-use Count may be stored in region 166 of nonvolatile memory. In one embodiment, the File-use Count data is stored within the already created File-Use record (e.g., 300 of FIG. 3A) If a corrective update of the File-tag records had not taken place in above step 220 (because the earlier creation of the decrypted plaintext was at the behest of a different application program), then in one embodiment the addition of a new File-tag record for the current application program takes place in step 223.

If the answer at the plaintext-available? test step 220 is No, control passes to step 224 or to its optional bypass path 225.

The positioning of the plaintext-available? test 220 and of response steps 222-223 in the process flow above next-described steps 224-228 presumes a single-user environment. For performance's sake, once that single user has demonstrated in a first instance that he or she has valid access rights (by way of an earlier, successful execution through ensuing steps 224 and/or 226), that user is deemed to continue to have access rights.

In an alternate, multi-user environment, steps 220-222-223 would be instead placed in the flow path at the position 'X-' between steps 226 and 230; and B1 would feed directly into step 224 and its optional bypass 225. In such a latter case, each user's access rights would be tested with each attempt at a file-OPEN rather than just the first time any one user tries to access the file.

At test step 224, if it is not optionally bypassed by path 225, a so-called 'security label' area of the requested file is read and tested. The 'security label', if utilized, is usually located at or near the beginning of each encrypted file. If the file's security label (not shown) is found to be valid and in accordance with a prespecified format, control passes to step 226.

If the area in the requested file that is supposed to have a valid 'security label' does not have such a properly formatted security label, control passes to step 228.

Step 228 forces a return of a 'failed' File-open operation and exits the On-Open intercept routine 200 by way of step 299. In response, the operating system kernel 134 refuses to open the requested file and returns a 'failed file-open' message back to the requesting application program 170.

In an alternate embodiment (224a), rather than passing to step 228 (Force a Failed Open) on a No response to the Valid_Security_Label? check 224, the On-Open intercept routine 200 is instead exited by way of step 299. This alternate embodiment (224a) assumes that a file without a valid security label is inherently a plaintext file and does not participate in OTF recryption.

In one specific embodiment, the security label of each requested file is structured in accordance with a separate invention corresponding to the above-cited application of Shawn Lohstroh et al., that is initially entitled, CRYPTOGRAPHIC FILE LABELING SYSTEM FOR SUPPORTING SECURED ACCESS BY MULTIPLE USERS.

Briefly; such a multi-user security label has a first field that defines the type of decryption algorithm to be used for obtaining a plaintext version of the remainder of the file. By way of example, one of a plurality of algorithms such as: (1) the Data Encryption Standard (DES), (2) RSA RC4™, and (3) Blowfish may be specified by this first field.

The multi-user security label further includes a list that defines a valid user identification number for each authorized user. The OS or another interacting software module is expected to furnish a matching user identification number (User ID) with each file-OPEN request. If it does not, test 226 fails.

In an alternate single-user embodiment, the user's identification number (User ID) is defined during system boot-up and/or initialization. The security software writes a username/password dialog box onto the system monitor during initialization. After the user fills in the appropriate information, the security software looks up a corresponding User ID in a pre-recorded on-disk list and saves it. If there is none, the security software saves a null ID. Thereafter, the security software checks the saved User ID in test 226 against the list in the multi-user security label. If there is no match, test 226 fails.

For each user identification number defined within the multi-user security label, there is also a corresponding, encrypted key string recorded within the multi-user security label. A plaintext version of this encrypted key string defines the decryption key that is needed for decrypting the remainder of the file below the multi-user security label.

The encrypted key string within the multi-user security label is formed by encrypting the plaintext of the needed decryption key using the authorized user's public key pursuant to a so-called public-key/private-key encryption system. (RSA RC4™ is an example of such a public-key/private-key encryption system.) Accordingly, the private key of the same authorized user must be obtained in order to decrypt the encrypted key string corresponding to that user's identification number (User ID). Once the encrypted key string is decrypted with the private-key, and the plaintext of the decryption key is obtained, the present file can be decrypted with the thus obtained plaintext version of the decryption key.

If a security labeling system is not used, bypass path 225 is instead taken.

At step 226 a check is made of the requesting user's right to access the requested file. Such a right's check can be carried out in multiple ways. If a file security labeling system is used, the user identification number of the current file requester (obtained from the OS) can be compared against the list of authorized users within the file's security label to see if there is a match.

Alternatively or additionally, the recryption rules file 169 (FIG. 1) of the directory in which the requested file immediately resides can be scanned to determine if the requesting user is identified in that rules file 169 as an authorized user.

In addition to, or as an alternative to checking the rules file 169 and the file's security label, other security tests can be performed in step 226 as deemed appropriate to determine whether the requesting user and/or the requesting application program has valid access rights.

If the result at the access-rights verification step 226 is negative (No), then control is passed to step 228 where the intercept routine forces a 'failed file-open' to occur as it exits and returns control to the normal file-open service module by way of step 299.

If the result at the access-rights verification step 226 is instead positive (Yes), then control passes to a decrypting process such as that of steps 230–250 and a decrypted version of the requested file is made available to the authorized requester.

In steps 230 through 250, a preferred file-renaming procedure is undertaken in order to avoid re-encryption of decrypted plaintext where not necessary. Alternative approaches to decryption can of course be used instead.

At the start of step 230, in portion 231, a new File-Use record is preferably created and its File-Use Count is initialized to 1. See FIG. 3A which will be detailed shortly. (Execution of substep 231 is optional and may be bypassed if File-use records are not being employed.)

Thereafter, at portion 232, if a File-Tag record had not been previously created for linking the identity of the calling application program and with the identity of the requested file, such a File-Tag record is preferably now created and inserted in a File-Tags linked-list. (See for example, items 384 and 387 of FIG. 3C which will be detailed shortly. Execution of substep 232 is optional and may be bypassed.)

Figure 3A:
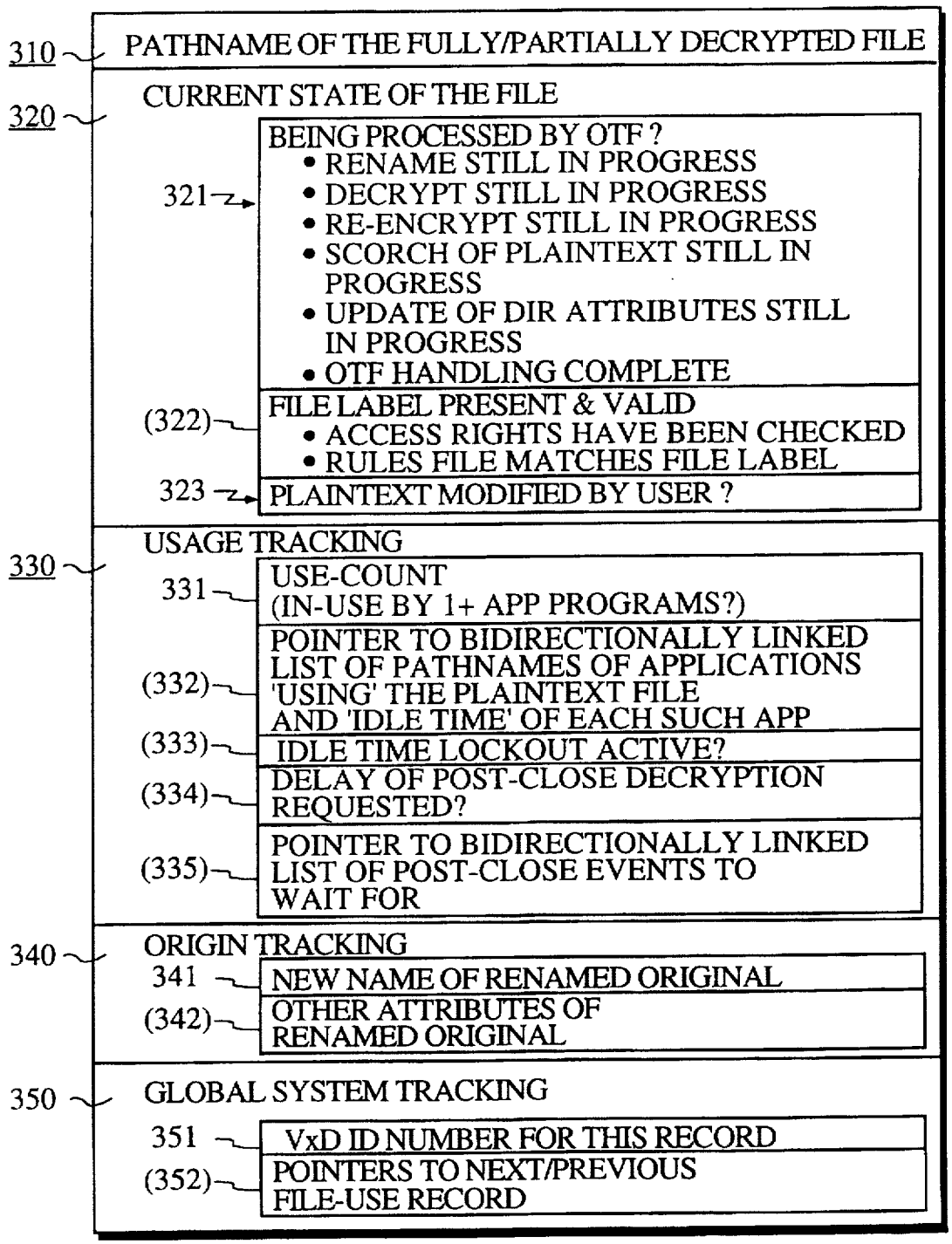
FIG. 3A shows the data structure of a File-Use record in accordance with the invention.

Thereafter, at portion 233, the original name (e.g., 'A.001') of the requested file (e.g., 161) is saved. The name is preferably saved as part of the original pathname of the file in field 310 of the just-created File-Use record (FIG. 3A). The name may be alternatively stored in any other convenient, nonvolatile memory area for safekeeping. Also, a 'current state' field 321 (FIG. 3A) of the file's corresponding File-Use record 300 is set to indicate a 'Rename Still in Progress' state for that file.

Thereafter, at portion 234, the original stored data of the requested file is renamed. This is done by accessing the disk subsystem directory 151 and overwriting the original file name (e.g., 'A.001') with a unique new file name (e.g., 'JAN_1_96.001').

In one embodiment, the unique new file name is selected as follows. The current time and/or current date is used to generate a unique alpha-numeric string (e.g., 'JAN_1_96.001') conforming to the file-naming protocol of the operating system (e.g., in MS-DOS™ the string would conform to the 8.3 format). The generated string is compared against all other file names listed in the corresponding directory of the requested file. If there is a collision (a pre-existing same name), a numeric portion of the generated string is incremented or decremented by a small value such as one (±1) and the collision test and revise procedure is repeated until there is no collision. Then the non-colliding unique alpha-numeric string (e.g., 'JAN_1_96.002') is used as the new name for the original stored data.

Thereafter, at portion 235, the renamed original file (e.g., 'JAN_1_96.002') is opened for reading.

To prevent the recursion problem mentioned above, namely, that the File-open request sent by the intercept program 200 at step 230 (e.g., OPEN JAN_1_96.002) will itself generate multiple invocations of the same intercept program 200, any of the quick-exit methods depicted by steps 210, 212, 214 and 216 may be used.

In one embodiment, the Open-file intercept routine 210 is permanently listed on the excluded programs list 157 (FIG. 1) to thereby force a Yes answer for the excluded-program check step 216 of FIG. 2A. When step 230 outputs one or more open-file requests to the OS kernel 134, the open is carried out with minimal delay.

Alternatively, or additionally, because in step 222, the 'current state' field 321 (FIG. 3A) of the corresponding File-Use record 300 is checked to see if the file is being currently processed by an OTF module; if for some reason the earlier check points do not block the intercept of the OTF-originated OPEN from proceeding too far, when step 222 of the secondly invoked Open is executed, it forces an exit without increment through step 222 (because OTF_Invoked if found to be true).

The 'current state' field 321 (FIG. 3A) is reset to the 'OTF Handling Complete' state at the completion of step 250. 'OTF Handling Complete' produces a false (No) answer for the OTF-Invoked? test of step 222.

As next indicated at portion 236, a new file is created and opened for writing thereto. The new file is given the original filename (e.g., 'A.001') that had been saved at step 233.

Upon entrance into section 240, the indicator 'Decrypt Still in Progress' is set true for field 321 (FIG. 3A).

In portion 241 of section 240, encrypted text is read from the renamed original file (e.g., 'JAN_1_96.002'), it is decrypted (242), and the resulting plaintext is written (243) into the new file. The decryption method may be in accordance with a wide variety of encryption/decryption methods including, but not limited to, DES, RSA RC4™, and Blowfish. The appropriate decryption key may be obtained using a variety of security methods including the above-mentioned method of encrypting the decryption key with the authorized user's public encryption key.

At the start of subsequent step 250, the 'current state' field 321 (FIG. 3A) is reset to the 'Update of Directory Attributes Still in Progress' state. Then within step 250 the renamed original file (e.g., 'JAN_1_96.002') is closed (251). The new file that contains the decrypted plaintext is also closed (252).

At the end of step 250, return path 259 passes control to the routine exit step 299 and the operating system is allowed to continue with a normal file-open procedure. In this case, the normal file-open procedure will open the just-created plaintext new file rather than the renamed original file (e.g., 'JAN_1_96.002'). The calling application program APP_#M 170 will be unaware of the fact that the file information it had requested was originally encrypted and had been decrypted.

Referring briefly back to FIG. 1, in section 172 of application program APP_#M, the generated plaintext information within the new file created at step 243 (FIG. 2B) is processed in accordance with instructions contained within application program section 172.

When application program APP_#M 170 finishes using the plaintext information, program 170 will usually generate a request for a File-CLOSE operation as indicated at 173. The response to such a file-CLOSE request 173 will be detailed below. (See FIGS. 4A–4D)

In one case of such usage, where APP_#M is the only application that has requested an opening of the encrypted file (e.g., of the encrypted file originally named 'A.001' and stored at 161), and the usage of the plaintext information at 172 did not involve any modification of the plaintext information, the response to the File-CLOSE request 173 is to scorch the plaintext file and to change the name of the renamed original file (see step 230) back to its original name (e.g., 'A.001'). In this way, unnecessary re-encryption is avoided.

Before moving on to the file-CLOSE response, a preferred data structure for a File-Use record 300 will first be described with reference to FIG. 3A. Record 300 is subdivided into a plurality of major sections including a storage locating section 310 for identifying the storage location of the fully or partially decrypted file by way of its pathname or otherwise. In the embodiment that employs steps 230–240, this pathname is the same as the original pathname (e.g., 'C:\S\A.001') of the original file prior to the intercept of the first file-OPEN request. The same pathname becomes the identifier of the decrypted plaintext after step 240 (FIG. 2B) completes. Step 240 may take considerable time to complete. During this time, storage locating section 310 points to a partially decrypted file. This is why section 310 is referred to as being for identifying the storage location of the partially or fully decrypted file.

Another section 320 of the File-use record describes the current state of the fully or partially decrypted file.

A first portion 321 of the record section 320 indicates whether the fully/partially decrypted file is currently being processed by an OTF module.

A first state-code may be established in portion 321 for indicating that renaming of the original file and assignment of the original name to the fully/partially decrypted file is in progress.

A second state-code indicates that decryption (step 240) is still in progress.

A third state-code indicates that a scorching of the plaintext within the decrypted file is now in progress.

A fifth state-code indicates that file specifying attributes within the system directory 151 are now being updated.

A sixth state-code indicates that OTF modules are not presently processing the file named in section 310 and that this file is therefore free for usage by an application program. An example of such application program usage is execution of code section 172 of FIG. 1.

A second (optional) portion 322 of the current file-state section 320 indicates whether a file security label of appropriate format has been found. Second portion 322 can include a flag indicating that user access rights have been verified by checking the file security label and/or by checking the recryption rules file 169 of the local directory.

Another flag in portion 322 can indicate whether the specifications within the files security label match the specifications within the rules file 169 of the local directory. At various times, the recryption rules file 169 of a local directory may be altered by the system administrator. The system software may be asked to thereafter modify the security labels of all the files contained in that directory to match the specifications of the local recryption rules file 169.

A third portion 323 of section 320 indicates whether or not the plaintext of the file named in section 310 has been modified by a user. If it has, re-encryption of the modified plaintext data may be necessary once all applications have finished using that decrypted plaintext.

A third section 330 of the File-Use record tracks the usage of the fully decrypted file by various application programs.

Figure 3B:
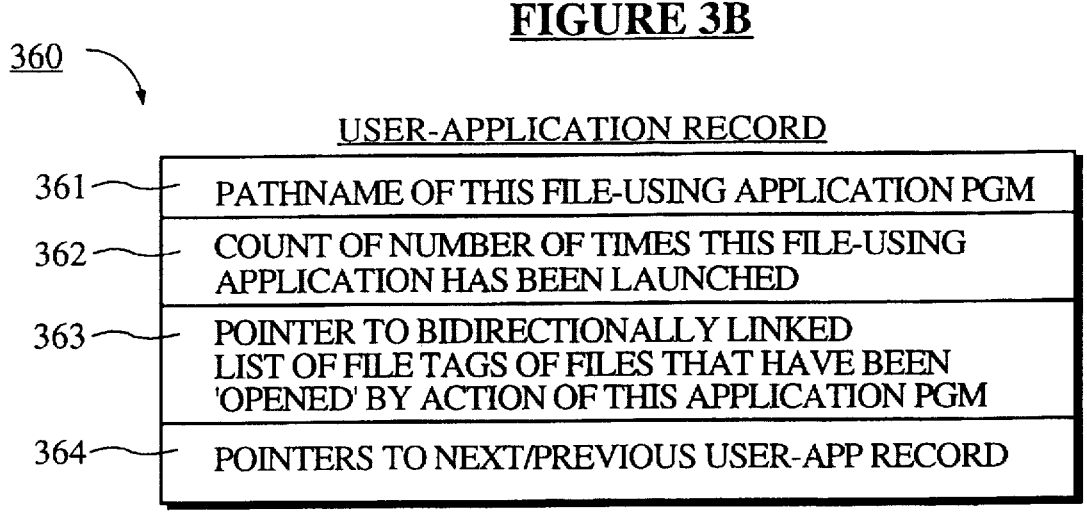
FIG. 3B shows the data structure of a User-Application record in accordance with the invention.
Figure 3C:
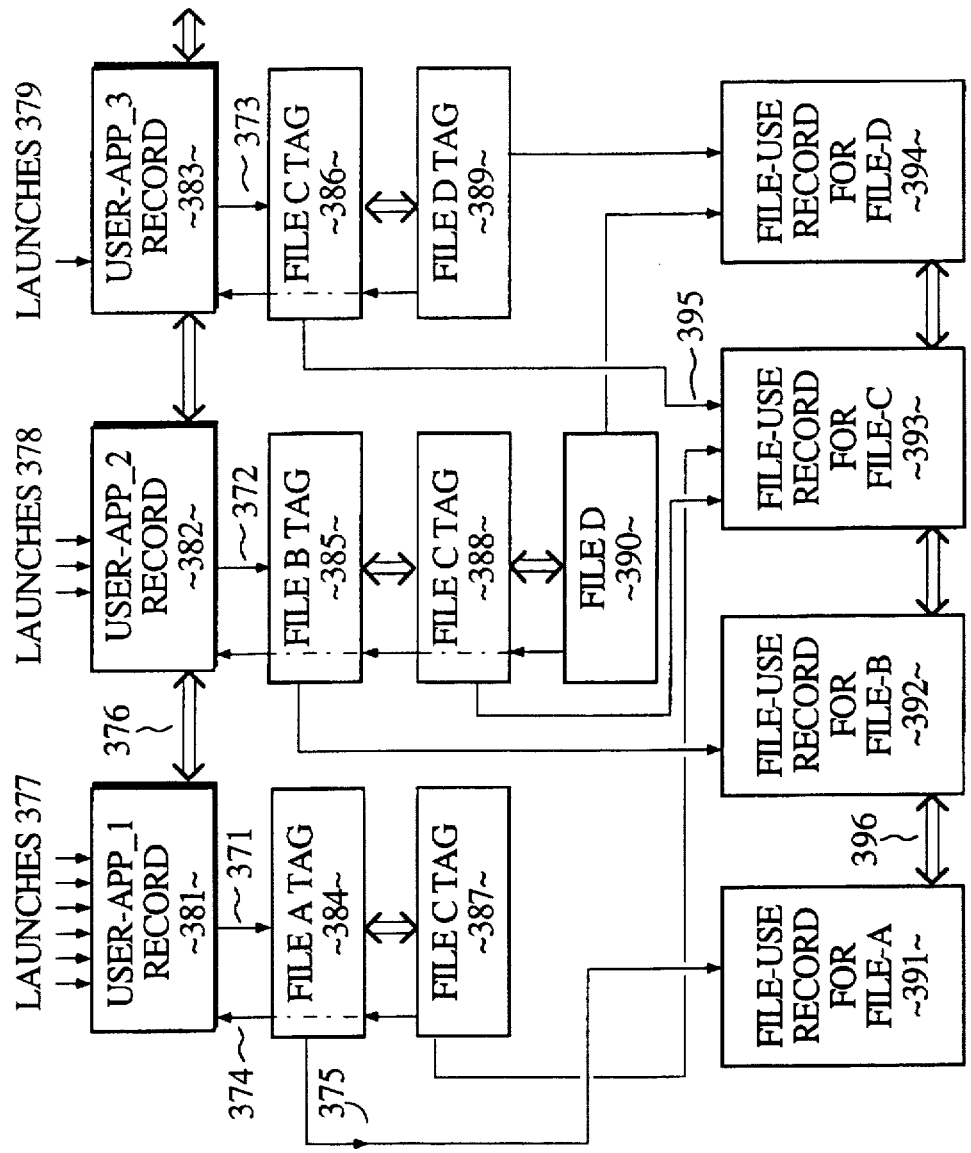
FIG. 3C shows a sample logical interconnect that is created between the file tracking information maintained by the File-Use records and the application tracking information maintained by the User-Application records when File-tag records are added to respective lists of each User-application record.

Referring briefly to FIG. 3C, it can be seen that multiple application programs may be simultaneously using a same decrypted version of a given file. In the example shown in FIG. 3C, decrypted FILE-C is indicated to be 'in use' simultaneously by three different application programs, APP_1, APP_2, and APP_3.

Returning to FIG. 3A, third section 330 includes a File-Use Count field 331. This field 331 is incremented each time an application program issues a file-OPEN request for the file named in section 310. The File-Use Count increment occurs in the aforementioned step 223. However, the count is not incremented as indicated at 222 (FIG. 2B) if the file-OPEN request is invoked by an OTF procedure.

A second portion 332 (optional) of the file-usage tracking section 330 contains a pointer to a is bidirectionally linked (doubly linked) list of records where each such record contains a pathname for a respective application program that is currently 'using' the plaintext of the file named in section 310 and the User ID of the user that is using that instance of the application program. The linked list may optionally included idle time specifications for each such application instance and flags for indicating whether excessive idle time for each such application program is to invoke a temporary security lockout. The idle time indicates the latest span of non-use by the specified user for that application and for the 'secured' file that is named in section 310. If the idle times of all or a selected subset of the using applications (and/or specific users) exceeds a predetermined threshold, the security system may elect to optionally lock out these application instances from access to the plaintext. This can be done by listing such application programs or their users on a temporary exclusion list. The user would be asked to enter a password before access is regranted by removing the named programs and/or the user's ID from the temporary exclusion list. Portion 333 may contain a flag indicating that an idle time lockout is active.

In a single-user system, keyboard activity could be periodically monitored and a security screen-saver can be pasted onto the monitor screen to temporarily cover up what was being displayed if a predefined idle-time is exceeded. The user is then asked to enter a password before further access through the keyboard is regranted and the screen-saver is removed from the screen.

Another portion 334 (optional) of the usage tracking section may indicate whether a delay of a post-close decryption has been requested. Such a delay is granted for example, to 'special applications' listed in one of the special-use lists 167 (FIG. 1).

Yet another portion 335 (optional) of the usage tracking section may contain a pointer to a bidirectionally linked list of records that define post-close events whose occurrences are to be waited for before re-encryption or scorching of the decrypted file named in section 310 begins.

A fourth section 340 of the File-use record keeps track of the original file that was requested. One portion 341 of section 340 may be used for storing the new name (e.g., 'JAN_1_96.002') of the renamed original file. A further portion 342 (optional) of the origin tracking section may be used for storing other attributes of the renamed original file such as size, last-revision date, user-permissions, and so forth. These other attributes may be compared to the attributes of the decrypted file named in section 310 to see if corresponding attributes of the system directory 151 need to be updated after a file-CLOSE.

A fifth section 350 of the File-Use records may be used for global system tracking. One portion 351 of the global system tracking section may contain a virtual device driver identification number that is used by virtual device drivers (VxD's) for passing identification of the present file between different levels of the operating system (e.g., between ring 3 and ring 0).

Another portion 352 (optional) of the global system tracking section 350 may be used for storing pointers to the next and/or previous File-Use record of a linked list of such File-Use records (such an optional structure is indicated by symbol 396 in FIG. 3C).

Referring to FIG. 3B, a preferred data structure for a User-Application record 360 in accordance with the invention is shown. Just as the File-Use record 300 tracks various attributes of an 'in-use' secured file, the user-application record 360 keeps track of what files a given application program is using and how many instances of the application have been launched. A first section 361 of the User-Application record stores the pathname of the file-using application program for which this record 360 has been created.

A second section 362 keeps count of the number of times that the present file-using application has been launched and not correspondingly terminated. In a multi-threaded environment, multiple instances of a given application program may be launched. As some of the launched application program terminate, others of the launched instances may still be using a decrypted copy of a given file. It is desirable to keep track when the last instance of the identified application program finishes using such files so that the files are not re-encrypted and closed prematurely. (Such multiple launches of each application program are indicated by symbols 377–379 in FIG. 3C.)

A third section 363 of the User-Application record 360 contains a pointer to a bidirectionally linked list that identifies the files that have been opened by action of the present application program. Such a pointer is indicated by symbol 371 in FIG. 3C. As seen in the example of FIG. 3C, in one embodiment, pointer 363 points to a bidirectionally linked list of File-Tag records and these in turn point to respective File-Use records (391-394 of FIG. 3C).

A fourth section 364 of the User-Application record contains pointers to the next and/or previous User-Application record in a list of such records. Such bidirectional next/previous pointers are indicated by symbol 376 in next-described FIG. 3C.

FIG. 3C shows a schematic 380 of a sample logical interconnect between a plurality of User-Application records 381–383 and a plurality of File-Use records 391–394. The logical interconnect is defined by various File-tag records 384–390 that are selectively inserted into and removed from respective linked lists. The respective linked lists are pointed to by pointers 371, 372 and 373.

A bidirectionally linked list of four File-Use records 391, 392, 393, 394 is shown as an example at the bottom of FIG. 3C. Such linkage of the File-Use records is optional. Symbol 396 represents the bidirectional linkage between File-Use record 391 and File-Use record 392. Records in linked list 391-394 may be ordered alphabetically according to the pathnames of section 310 (FIG. 3C) or otherwise as desirable.

A bidirectionally linked list of three User-Application records 381, 382, 383, is shown as an example at the top of FIG. 3C. Symbol 376 represents the bidirectional linkage between User-Application record 381 and User-Application record 382. Records in linked list 381–383 may be ordered alphabetically according to the pathnames of section 361 (FIG. 3B) or otherwise as desirable. The number of records in each of lists 381–383 and 391–394 may of course vary with time and usage.

Pointer 371 within User-application record 381 defines a first interconnect tree by pointing to a first bidirectionally linked list of the File-Tag records defined by records 384 and 387.

Each File-Tag record (e.g., 384) contains a first pointer (e.g., 375) to a corresponding File-Use record (e.g., 391) belonging to a file that is currently 'in-use' by the application program (e.g., User-Application APP__1) of the User-application record 381 at the head of the first interconnect tree.

For performance reasons, each File-Tag record (e.g., 384) further contains an optional second pointer such as back-to-head pointer 374 for pointing directly from that File-tag record to the User-application record at the head of the respective interconnect tree.

In the illustrated example, FILE__A is indicated to be 'in use' only by User-Application APP__1 as a result of the logical interconnect defined to exist by File-Tag record 384 between File-Use record 391 and User-Application record 381.

FILE__C, on the other hand, is indicated to be 'in use' by three applications as indicated at 395 because of the logical interconnects defined by respective File-Tag records 387, 388 and 386.

As with pointer 371, pointer 372 within User-Application record 382 points to the head of a second doubly-linked list of File-Tag records, 385, 388 and 390. These File-Tag records in turn identify the files that are being currently used by user-application APP__2. In the illustrated example, this second linked list names the 'in use' files to be: FILE__B (as indicated at 385), FILE__C (as indicated at 388) and FILE__D (as indicated at 390).

In similar fashion, pointer 373 of user-application record 383 points to a third bidirectionally linked list and thereby identifies the files that are being currently used by user-application APP__3 as being: FILE__C (as indicated at 386) and FILE__D (as indicated at 389).

The respective multiple arrows, 377, 378 and 379, on top of the symbols for respective User-Application records 381, 382 and 383 indicate the number of instances of each given application that have been launched.

The combination of the File-Use records 391-394 and the User-Application records 381-383 may be used to track the state of each plaintext copy of confidential data and to determine if it is appropriate to remove that plaintext copy by scorching or re-encryption.

As seen from the number of launches (e.g., six) indicated by arrow heads 377 over User-Application record 381 of FIG. 3C, although FILE__A is 'in-use' only by user-application APP__1, there are multiple instances of application APP__1 that have been simultaneously launched and a termination of one such instance does not justify removing (eliminating) the plaintext of FILE__A because other instances of APP__1 may still need to use that same plaintext. The number-of-launches count 362 (FIG. 3B) in User-Application record 381 may be used to determine if it is appropriate to remove the plaintext of FILE__A.

The launch count 362 of a given User-Application record is generally not enough by itself though because the corresponding one application program may not be the only application using that file.

As seen in the case of FILE__C for example, the plaintext of FILE__C is 'in-use' by all three user-applications, APP__

1, APP_2, and APP_3 as indicated by the pointers 395 entering the top of the symbol for File-Use record 393. There is only one instance of user-application APP_3 using FILE_C as indicated by the single arrow symbol at 379. When the one instance of APP_3 terminates, there may still be a number of instances of APP_1 or APP_2 that are still using the plaintext of FILE_C. This concept will be revisited when box 425 (FIG. 4B) is described.

Figure 3D:
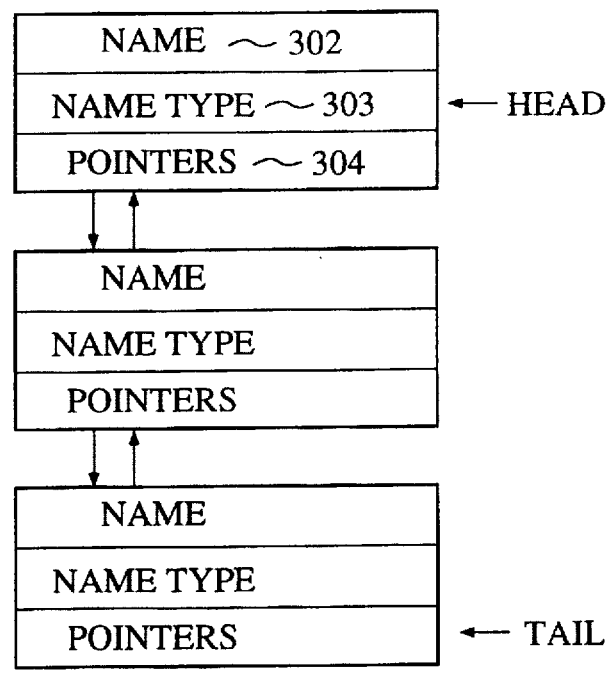
FIGS. 3D and 3E shows bidirectionally linked-list data structures that may be used for exclusion lists and other such lists.

Referring next to FIG. 3D, a linked list structure 305 that may be used for both the file exclusion lists and the special applications lists is shown at 305.

A sample record 301 of the bidirectionally linked list 305 is shown at 301. Record 301 includes a NAME field 302 for storing a name specification identifying one or more files. The NAME specification 302 can include wild card characters such as '*' and '?' of MS-DOS™ parlance or similar class-specifying elements of another operating system.

The NAME specification 302 can either specify a specific single file such as:

'C:\FOLDER1\FOLDER2\FILE.TXT';

or a class of files in a specific directory such as by the designation:

'C:\FOLDER_1\FOLDER_2\NEVER.*';

or every instance of a particular file name that happens to appear in any directory of the directory structure that has a specific file name such as:

'READ.ME';

or every instance of a particular class of files appearing in any directory and having a wild-card defined file name satisfying:

'*READ*.ME?'.

The NAME-TYPE field 303 of each record 301 indicates whether the NAME specifier 302 identifies a single file or a class of files in one or plural directories. Field 303 is used to avoid executing long searches and name comparisons when for example, only a single file of a single directory is being specified.

Section 304 of the linked list record 301 contains the forward and/or backwards pointers of the linked list. In a bidirectionally linked list, the back pointer of the head record should be set to a null or invalid value to indicate that this is the head record and similarly the forward pointer of the tail record should be so set to indicate that this is a tail record. Records in linked list 305 may be ordered alphabetically according to the NAME specifications 303 and/or TYPE specifications 303 or as otherwise as desired.

Figure 3E:
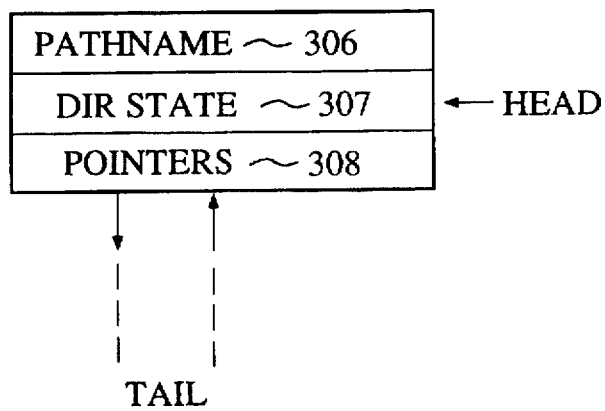

Referring to FIG. 3E, another doubly linked list structure 309 is shown for use with directory specifications such as the secured directories list. Field 306 specifies the pathname of either a specific directory or a class of directories (the latter being done by using wild cards '*' and '?').

Field 307 specifies a modification state for the identified directory or class of directories of field 306. The directory STATE field 307 can be encoded to indicate either: (1) no change in state; or (2) a change has been made to the list of authorized users which are to be allowed to access the files in the specified directory or directories; or (3) the encryption and decryption algorithms and/or keys to be used for the files in the specified directory or directories have been changed. Records in linked list 309 may be ordered alphabetically according to the NAME specifications 306 and/or STATE specifications 307 or as otherwise as desired.

FIGS. 4A–4D define a second machine-implemented process 400 in accordance with the invention for responding to the intercepts of file-CLOSE requests.

Figure 4A:
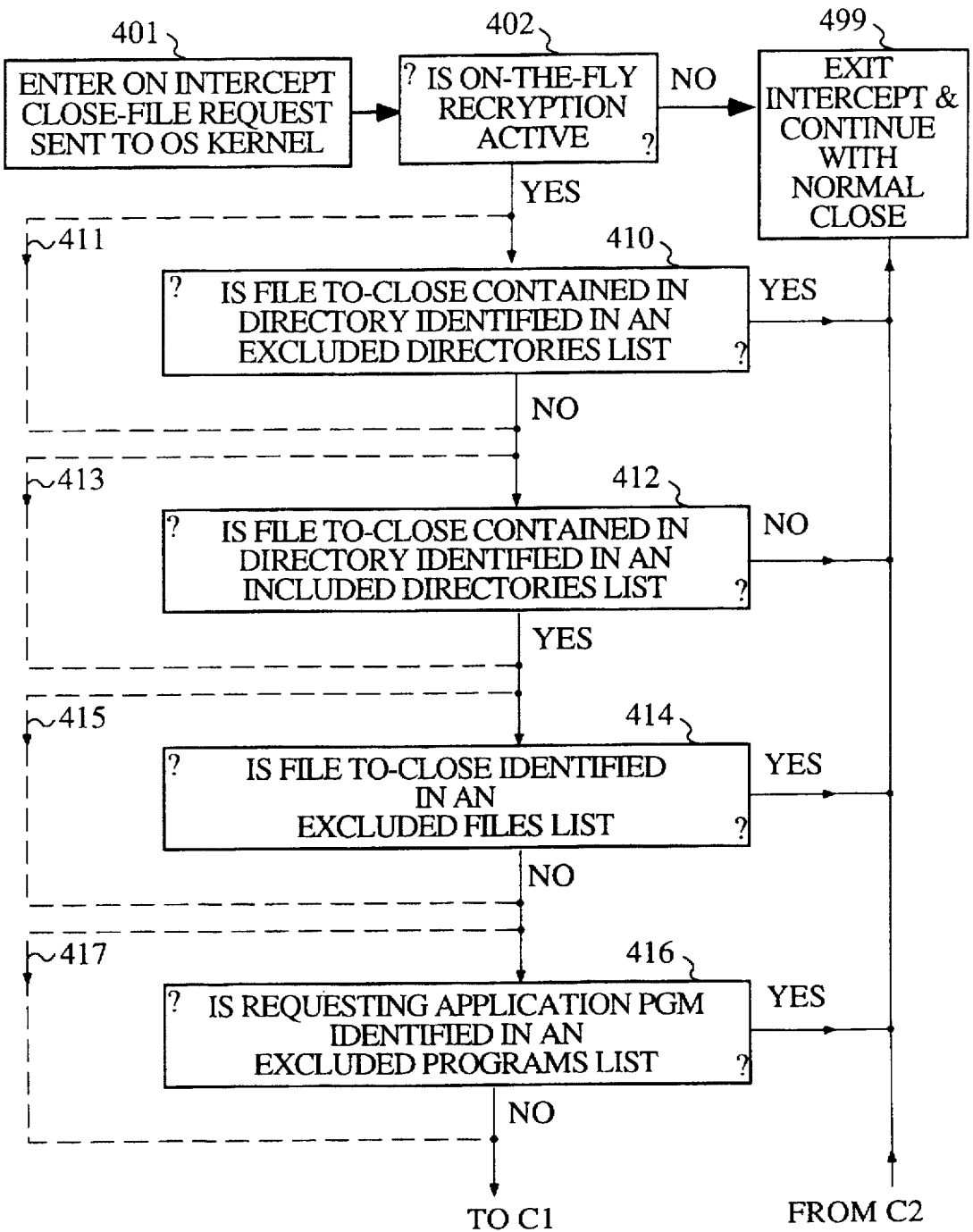
FIGS. 4A–4D form a second flow chart showing how a file-CLOSE intercept operates in accordance with the invention.

Like reference numerals in the '400' number series are used in FIG. 4A for elements of similar nature numbered in the '300' series in FIG. 2A and as such only an abbreviated explanation is needed here. As before, one or more, but not all, of respective test steps 410, 412, 414 and 416 may be optionally bypassed by respective bypass paths 411, 413, 415 and 417. The respective bypass paths 411, 413, 415 and 417 may be permanently or contingently established according to the desires of the system administrator. The sequential order of respective test steps 410, 412, 414 and 416 may be optionally rearranged to improve performance speed in accordance with system specifics. The On-Close intercept routine 400 is entered at step 401 upon interception of a file-CLOSE request sent to the OS kernel. At step 402, the system global flag is checked to see if on-the-fly recryption is currently 'active'. If the answer to the 'OTF active?' check 402 is No, the intercept routine 400 is quickly exited by way of exit step 499 and control is passed back to the file-CLOSE service routine of the OS kernel so as to allow the latter to complete the normal File-close procedure without further modification or delay.

Figure 4B:
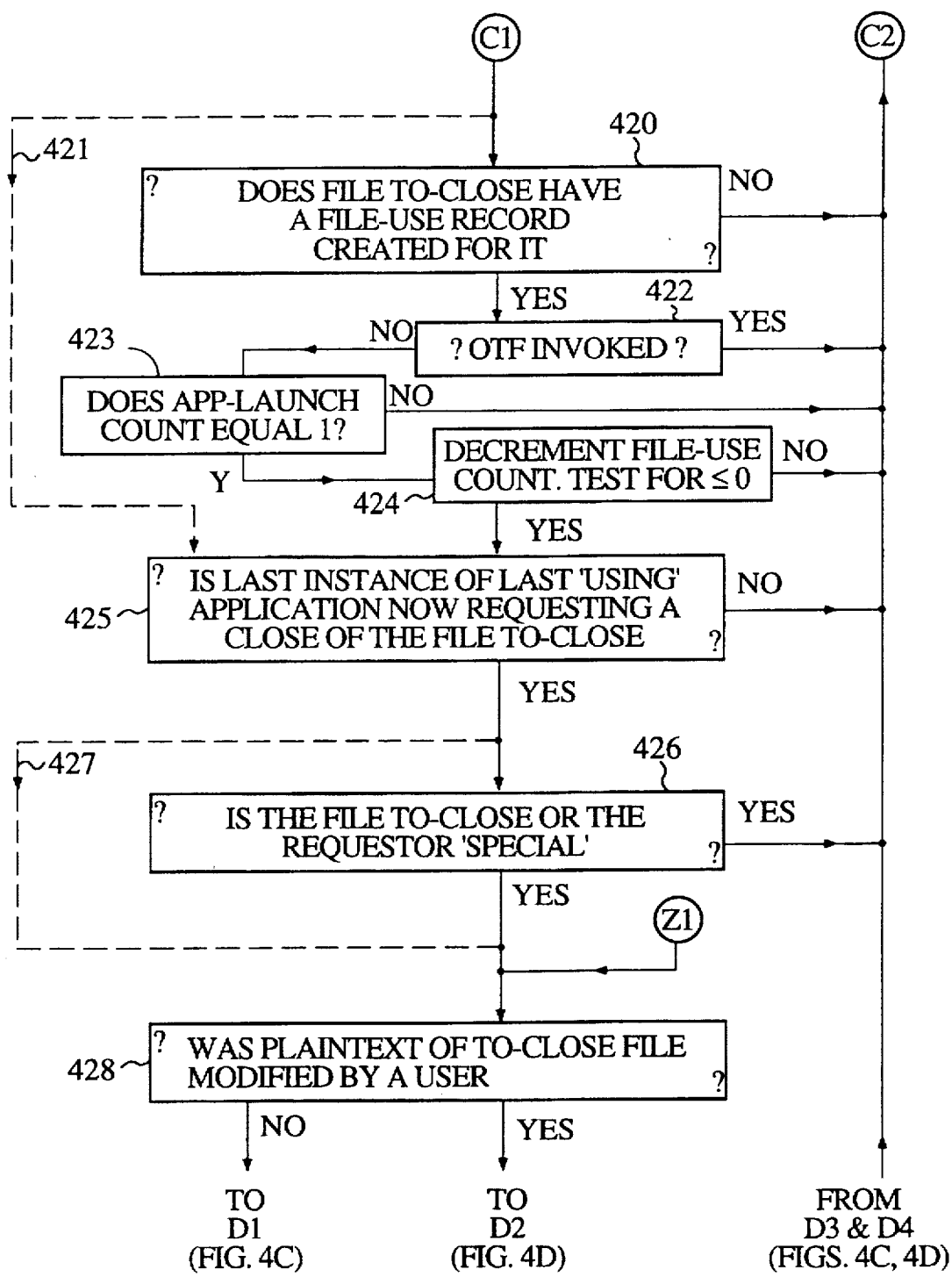

FIG. 4B is somewhat different from FIG. 2B and is thus described in more detail.

In step 425 it is determined if the current file-CLOSE request is from the last instance of the very last user-application program that is still 'using' the to-be-closed file. The basic concept behind this was described above with reference to FIG. 3C. The File-Use Count 331 keeps track of how many differently-named application programs are currently using the plaintext of the file being tracked by the respective File-Use record 300. The number-of-launches count 362 keeps track of the net number of same-named application programs that are under OTF supervision and are currently still launched. It is the File-Use Count that determines when the last instance of the last user is trying to close the OTF tracked file.

If the result of the Last-Instance_of_Last-User? test 425 is negative (No), the On-Close intercept routine 400 is exited by way of exit step 499.

In the embodiment that uses File-Use records and/or User-Application records and/or File-Tag records, steps 420–422–423–424 are executed prior to step 425. Otherwise bypass path 421 may be followed.

In step 420 it is determined whether the to-be-closed file has a File-Use record created for it. If it does not (No), then the to-be-closed file is not being tracked by the 'on-the-fly recryption' process and the On-Close intercept routine 400 is exited by way of exit step 499.

If the answer to the Has File-Use_Record? check 420 is Yes, control passes to step 422.

In step 422 it is determined whether the file-CLOSE request was issued at the behest of an OTF module, such as at the behest of step 250 (FIG. 2B). The 'current state' field 321 of the File-Use record may checked to answer this question. If the answer to the OTF_invoked? check 422 is Yes, the intercept routine 400 is exited by way of exit step 499.

On the other hand, if the answer to the OTF_invoked? check 422 is No, then in the following step 423, the number-of-launches count 362 in the User-Application record of the requesting application is tested to see if this file-CLOSE request is coming from the very last instance of that User-Application. If No, the intercept routine 400 is exited by way of exit step 499.

If the answer to the Last-instance? test 423 is Yes, that indicates the last instance of the named requestor is closing the file and that the file is thereafter no longer 'in use' by the named User-Application. Consequently, in following step 424, the File-Use Count 331 of the corresponding File-Use record is decremented and tested to see if a zero or negative count has been reached. (If negative, the File-Use Count is first reset to zero. In practice, the File-Use Count should not go below zero if all modules are operating correctly.) If No, the intercept routine 400 is exited by way of exit step 499.

If the answer to the File-Use Count Equal/Less-than Zero? check 424 is Yes, that indicates there are no more other current users of any name that have not issued a file-CLOSE on the plaintext data for which the current file-CLOSE is being requested. This information is passed forward to the Last-Instance_of_Last-User? test 425 so that test 425 knows this file-CLOSE request is coming from the last instance of the very last current user of the file.

The fact that the file-CLOSE request is coming from the last instance of the very last current user does not mean that the plaintext data should now be re-encrypted or scorched. It could be that the same or another application program will soon try to open the same-named file. Or it could be, that for reasons of performance speed, it is desirable to postpone re-encryption until after some predefined, post-CLOSE event (e.g., termination of a master application program). As such, in one embodiment (not bypassed by alternate path 427) control passes thereafter to test step 426.

In step 426 it is determined whether the file for which a file-CLOSE request has been received from a last instance of a last current user nonetheless should be kept in plaintext form because it belongs to a 'special' application program. The special-use lists 167 (FIG. 1) are checked to see if they identify the requestor as a 'special' file-using program for which the re-encryption portion of 'on-the-fly recryption' is to be delayed until after a prespecified post-CLOSE event takes place (e.g., termination of the same or another application program), and/or to see if the to-be-closed file is identified as a 'special' file for which the re-encryption portion of 'on-the-fly recryption' is to be similarly delayed until after a prespecified post-CLOSE event takes place (e.g., termination of a listed and cross referenced 'master' application program).

If the answer to the Special-file/requestor check step 426 is Yes, the intercept routine 400 is exited by way of exit step 499. This does not mean that the plaintext of the to-be-closed file remains forever in plaintext form. As will be seen in below step 546 (FIG. 5), the next-described, plaintext eliminating process which starts with step 428 is entered through entry point 'Z1' when the prespecified post-CLOSE event takes place.

In step 428 it is determined whether the plaintext of the to-be-closed file has been modified or not. This answer can be obtained from the operating system. Alternatively or additionally, file-WRITE requests can be intercepted, and if the WRITE is directed to a file having a File-Use record, portion 323 (FIG. 3A) can be set true to indicate that the corresponding plaintext has been modified. In step 428, portion 323 may be checked to see if it has been set true.

Figure 4C:
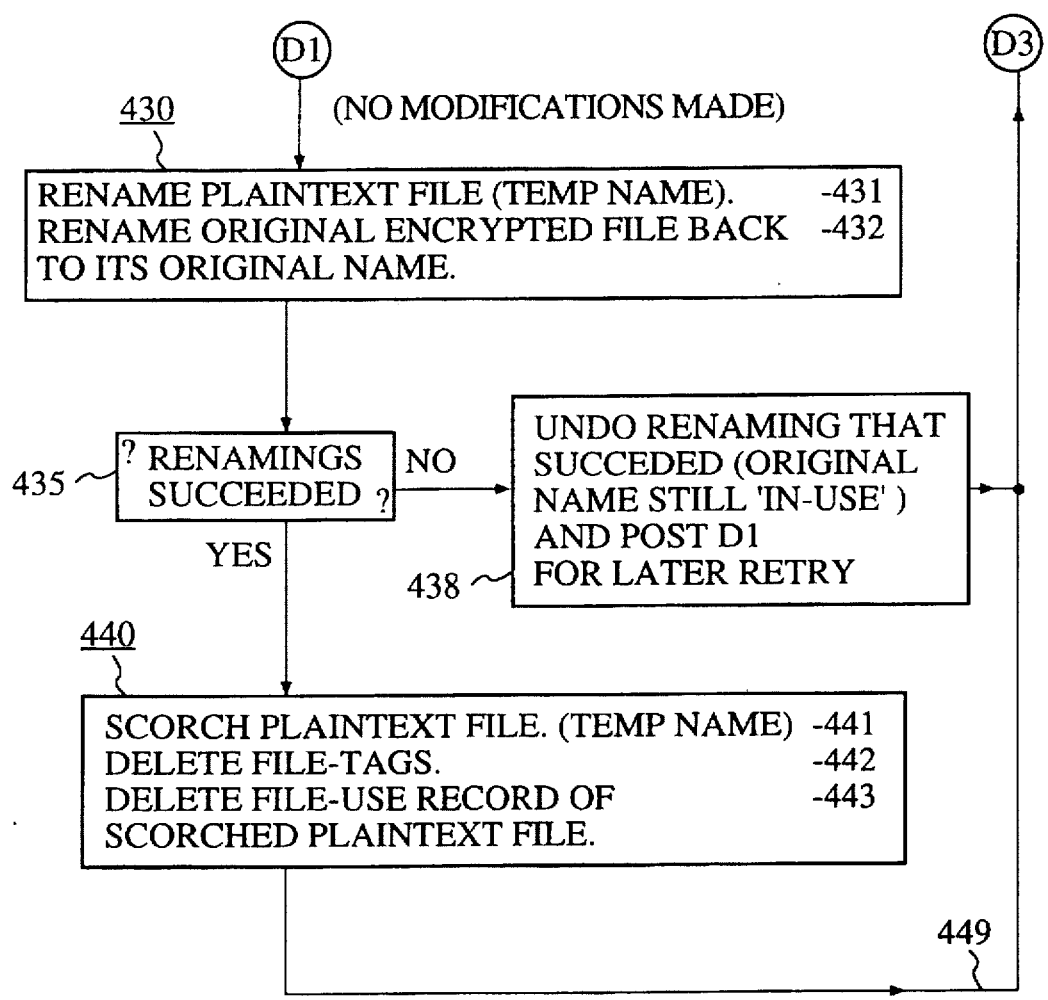

If the answer to the Plaintext Modified? test 428 is No, control passes to step 430 (FIG. 4C).

Referring to FIG. 4C, point D1 is entered with the understanding that the plaintext of the to-be-closed file has not been modified. Rather than re-encrypting the plaintext version, the renamed, still-encrypted original is retrieved and the plaintext is scorched.

As will be understood by those skilled in the art, there are a number of different levels to which one may take the file 'scorching' step 441 depending on various tradeoffs that are to be made between desired performance speed and acceptable levels of security.

If relatively little security is acceptable, 'scorching' may entail no more than asking the operating system to 'delete' the file. In many cases the latter leaves the file data intact and assigns the disk storage space to 'free space' such that eventually, the deleted data will be overwritten by other data as the disk's free space is consumed.

If a relatively higher level of security is desired, 'scorching' may include the step of first overwriting the corresponding disk storage area with a bit pattern such as '01010101...' before deleting the file.

If even higher levels of security are desired, before 'deleting' the file, 'scorching' may entail multiple overwrites across the corresponding disk storage area with each overwrite using a different bit pattern so as to more assuredly remove traces of the original bit pattern.

In portion 431 of step 430, the plaintext file (which currently has the original file name, e.g., 'A.001') is given a new, unique temporary name (e.g., 'JAN_1_96.003'). The above-described unique-name picking algorithm may be used.

In portion 432 of step 430, the still-encrypted original file (which currently has the earlier picked unique name, e.g., 'JAN_1_96.002') is given back its original name (e.g., 'A.001').

In a multi-threaded environment, the renaming attempts of step 430 might fail due to a synchronism problem such as the plaintext version still being deemed to be in-use by the operating system. In such a case the renaming attempt will fail. Such a failure is checked for at test step 435, and if there was a failure (Succeeded?=No), in step 438 the successful portion of the rename attempt is undone and task D1 is posted onto a system command queue for a retry at a later time. The intercept routine 400 is thereafter exited by way of exit step 499.

If the answer to the Renamings Succeeded? check 435 is Yes, control passes to step 440.

In portion 441 of step 440, the plaintext file (e.g., now named 'JAN_1_96.003') is scorched.

In portion 442, the File-Tag records (e.g., 387, 388, 386) if any, that still remain and point to the File-Use record of the scorched plaintext, are deleted from their respective linked lists. The back-to-head pointers 374 are, used in this step to speed the scan through the linked list of each User-Application record (381–383, see FIG. 3C).

In portion 443, the corresponding File-Use record is deleted. This step is carried out to indicate that there is no longer a plaintext version of the confidential information that needs tracking.

Thereafter, path 449 is taken, intercept routine 400 is exited by way of exit step 499 and the remainder of the normal file-CLOSE process is allowed to continue.

Figure 4D:
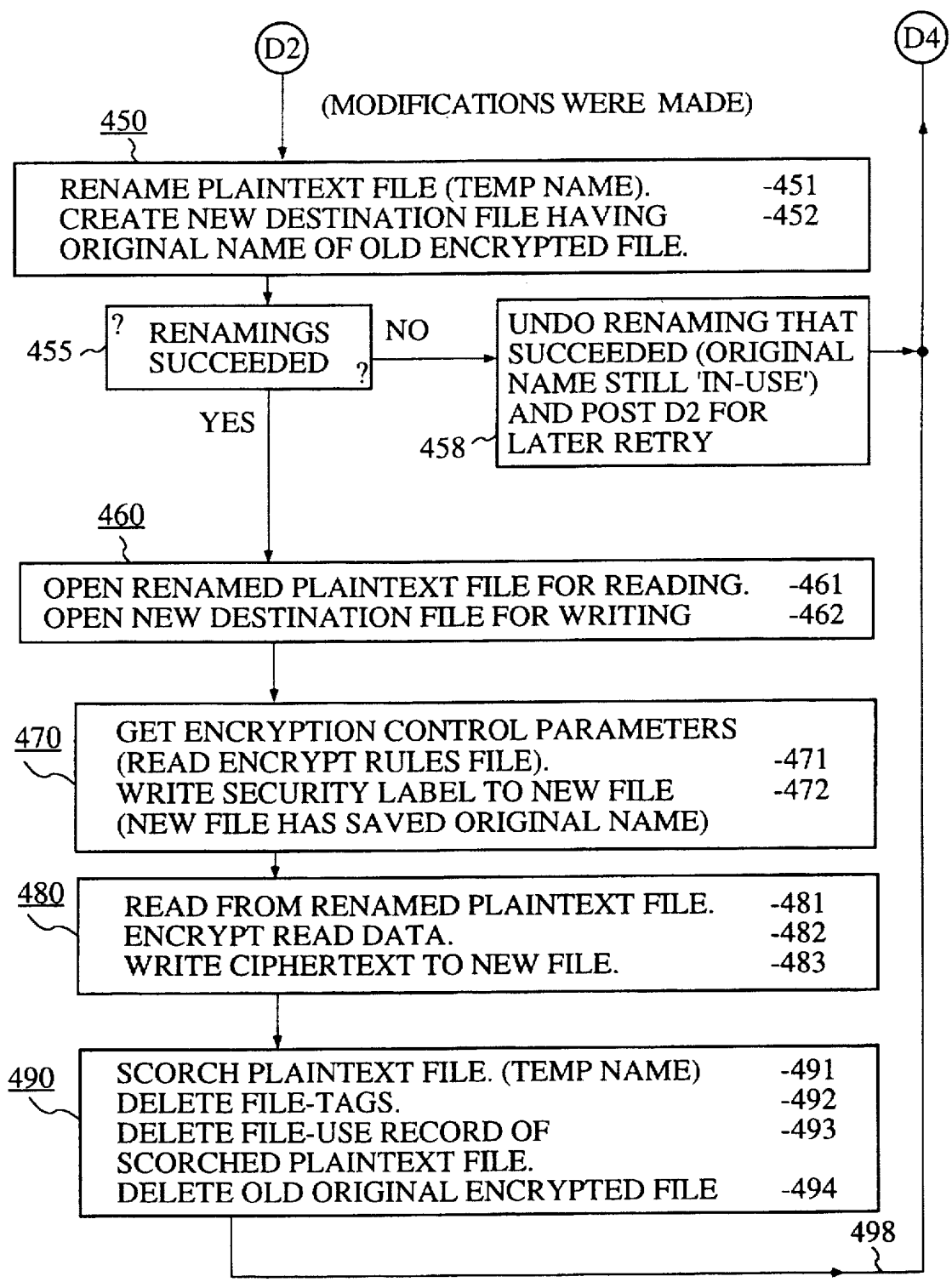

Returning to step 428 (FIG. 4B), if the answer to the Plaintext Modified? test is instead Yes, control passes step 450 (FIG. 4D).

Referring to FIG. 4D, point D2 is entered with the understanding that the plaintext of the to-be-closed file has been modified. The modified plaintext version now needs to be encrypted and the renamed, still-encrypted original is usually deleted in this same time period.

Steps 450 through 458 are similar to above-described steps 430 through 438 with just a few exceptions. In portion 452, a new destination file is created (opened) and given the original name (e.g., 'A.001') of the old encrypted file. If all goes well, the encrypted version of the modified plaintext will be stored into this new destination file. In portion 458, the successful portion of the rename attempts of 450 is undone and task D2 (not D1) is posted onto a system command queue for a retry at a later time.

If the answer to the Renamings Succeeded? check 455 is Yes, control passes to step 460.

In portion 461 of step 460, the plaintext file (e.g., now named 'JAN_1_96.003') is opened for reading.

In portion 462, the new destination file (e.g., now named 'A.001') is opened for writing thereinto.

In step 470, preparations are made for encrypting the plaintext. In portion 471, the encryption control parameters are obtained from the system security managing software. Such parameters can include a specification of the type of encryption algorithm to be used (e.g., DES, RSA RC4™, or Blowfish) and a specification of the encryption key to be used. In one embodiment such specifications are obtained from the recryption rules file 169 (FIG. 1) of the destination directory.

If a security label system is being used, then in portion 472 the appropriate security label is written into the new destination file. The security label may be copied from the old encrypted original (e.g., currently named 'JAN_1_96.002') or it may be derived from the data stored in the recryption rules file 169 (FIG. 1) of the destination directory.

Step 480 responsively carries out the actual encryption. In portion 481, the modified plaintext data is read from the plaintext file (e.g., now named 'JAN_1_96.003'). In portion 482, the so-read data is encrypted in accordance with the obtained encryption control parameters. And in portion 483, the resulting ciphertext is written into the new destination file (e.g., now named 'A.001').

As with other OTF modules, during the execution of various parts of the On-Close intercept routine 400, the 'current state' field 321 of the corresponding File-Use record is updated at the appropriate times to indicate when renaming is in progress, or re-encryption is in progress, or clean-up activities such as the scorching of the plaintext and the updating of the system's directory structure 151 are in progress.

Step 490 contains the post-encrypt, clean-up activities of FIG. 4D. In portion 491, the plaintext file (e.g., now named 'JAN_1_96.003') is scorched. In portion 492, the corresponding File-Tag records, if any are left (there shouldn't be any), are deleted from their respective linked lists. In portion 493, the corresponding File-Use record is deleted. And, in portion 494, the old encrypted original (e.g., currently named 'JAN_1_96.002') is optionally deleted. (If the system administrator wants to retain older files for some length of time, then the system administrator would cause the appropriate book keeping to occur at this time for linking the retained old file (e.g., named 'JAN_1_96.002') with the newly encrypted file (e.g., now named 'A.001').)

The On-Close intercept routine 400 is thereafter exited as indicated at 498 by way of exit step 499 and the remainder of the normal file-CLOSE process is allowed to continue.

FIG. 5 defines a third machine-implemented process 500 in accordance with the invention for responding to the intercepts of application program TERMINATE requests.

Like reference numerals in the '500' number series are used in FIG. 5 for elements of similar nature numbered in the '400' series in FIG. 4A and as such only an abbreviated explanation is needed here.

In step 516, if it is not bypassed by optional path 517, the Excluded Programs List of memory region 157 (FIG. 1) is consulted to see if the terminating application program is listed or otherwise identified in such an Excluded Programs List.

If the answer at the excluded-program check step 516 is Yes, the intercept routine 500 is exited by way of step 599 and the program-TERMINATE process is allowed to complete normally. If the answer is No, control passes to step 520.

In step 520 it is determined whether the present termination is that of the execution of the last instance of the application program named in the program-TERMINATE request. If the answer is No, that means there are other instances still executing. The number-of-launches count 362 is decremented to thereby keep proper book keeping of the current termination and the intercept routine 500 is thereafter exited by way of step 599.

In the embodiment that uses File-Use records and/or User-Application records and/or File-Tag records, step 520 operates similar to previously described steps 420–423–424. In portion 521, the User-Application record of the terminating program is fetched. In portion 522, the launch counted is decremented and if the result is greater than zero (No to question 523), the On-TERMINATE intercept routine 500 is exited by way of step 599 as already indicated above.

If the answer to the Launch Count $\leq 0$? test 523 is Yes, control passes to clean-up steps 530–540.

In step 530, each OTF-tracked file that is still 'in use' by the currently terminating, last instance of the application program is identified. In one embodiment, step 530 includes a first substep 531 of locating each File-Tag record (e.g., 384 and 387 of FIG. 3C) in the list pointed to by the User-Application record (e.g., 381) of the terminating application program and a second substep 532 of using the pointer (e.g., 375) of each located File-Tag record to locate the corresponding File-Use record (e.g., 391).

In step 540, each OTF-tracked file that is still 'in use' by the currently terminating application processed according to the state of that file.

In substep 541 the File-Use Count of the corresponding 'in use' file is decremented. (If the count goes negative, it is reset to zero.)

In substep 542 the File-Tag record of the corresponding 'in use' file and of the terminating application is deleted.

In substep 543 it is determined whether the currently terminating application is the very last user of the 'in use' file that is under consideration (e.g., by virtue of the File-Use Count having decremented to zero or below). If the answer to the Last Use? check 543 is Yes, then that means there should be no left-over File-Tag records pointing to the File-Use record of the file under consideration. At step 544, any such left-over File-Tag records are deleted. (Note that the File-Use record is not yet deleted.)

In substep 545 it is determined whether the file under consideration is identified in a temporary exclusion list. The file may be identified in such a TELOF if the same file is to be opened by another application program soon after the currently terminating application program terminates. In such a case it may not be desirable for performance reasons to encrypt the file and to soon thereafter decrypt the same file.

Additionally or alternatively, in substep 545 it is determined whether the currently terminating application is identified in a 'Delay Re-encryption Inclusion List'. The 'Delay Re-encryption Inclusion List', (not shown) may be used for temporarily blocking re-encryption of files used by a first terminating application program where that first program is to be soon followed by execution of a second application program that will use the same files. In such a case it may not be desirable for performance reasons to encrypt the files and to soon thereafter decrypt the same files. There should be a 'master' application program under which the first and second programs run. The 'master' application program should not be identified in the 'Delay Re-encryption Inclusion List'. When the 'master' application program terminates, all the confidential files used by its subordinate programs are re-encrypted at that time by virtue of the 'Delay Re-encryption?' test 545 giving a No answer.

If the 'Delay Re-encryption?' test 545 results in a No answer, subroutine Z1 (FIG. 4B) is called at step 546. The exit points D3 and D4 of the now called subroutine Zi (FIG. 4B) do not return to exit step 499 but rather back to box 540 (FIG. 5). Calling subroutine Z1 forces a removal by re-encryption and/or scorching of the no-longer-used plain-text and deletion of the corresponding File-Use record in accordance with the above descriptions of FIGS. 4C and 4D (except of course that on the exit of the Z1 subroutine return is made to the end of step 546.

At the end of substep 546 (or failed substep 545), the next identified confidential file that was 'in use' by the currently terminating application program is processed in accordance with substeps 541–546.

In substep 547, after the last of the identified files has been processed in accordance with substeps 541–546, the User-Application record 360 of the currently terminating application program is deleted from the linked list (see 376 of FIG. 3C) of such records. Thereafter, the On-TERMINATE intercept routine 500 is exited as indicated at 549 by way of exit step 599 and the remainder of the normal application program termination process is allowed to continue.

Figure 6:
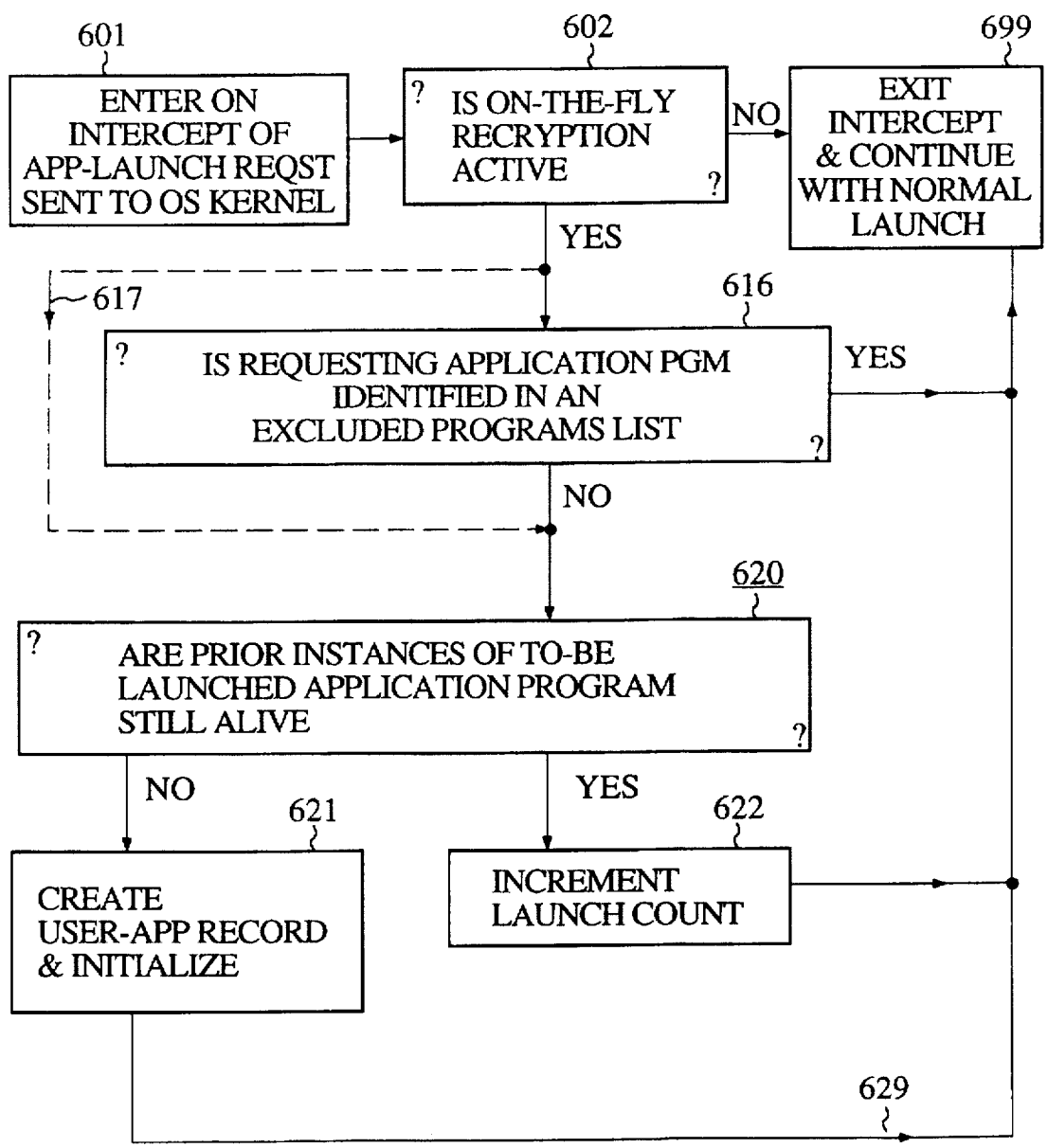
FIG. 6 is a fourth flow chart showing how a program-LAUNCH intercept operates in accordance with the invention.

FIG. 6 defines a fourth machine-implemented process 600 in accordance with the invention for responding to the intercepts of application program LAUNCH requests.

Like reference numerals in the '600' number series are used in FIG. 6 for elements of similar nature numbered in the '500' series in FIG. 5 and as such only an abbreviated explanation is needed here.

In step 616, if it is not bypassed by optional path 617, the Excluded Programs List of memory region 157 (FIG. 1) is consulted to see if the application program that is now to be launched for execution is listed or otherwise identified in such an Excluded Programs List.

If the answer at the excluded-program check step 616 is Yes, the On-LAUNCH intercept routine 600 is exited by way of step 699 and the application-LAUNCH process is allowed to complete normally. If the answer is No, control passes to step 620.

In step 620 it is determined whether the present launching is that for the execution of a first instance of the application program named in the application-LAUNCH request. This can be done by scanning the linked list (e.g., 381–383-etc. of FIG. 3C) of User-Application records for a record having a matching pathname in section 361 (FIG. 3B).

If the answer to the Other_Instances Alive? check 620 is Yes, that means there are other instances concurrently executing. The number-of-launches count 362 is incremented to thereby keep proper book keeping of the current launching and the intercept routine 600 is thereafter exited by way of step 699.

If the answer to the Other_Instances_Alive? check 620 is No, a corresponding new User-Application record 360 is created and added to the linked list of such records and the entries in the newly added record are initialized to indicate that this is the first launch and there are no confidential files yet opened by this application program.

Thereafter, the On-LAUNCH intercept routine 600 is exited as indicated at 629 by way of exit step 699 and the remainder of the normal application program launching process is allowed to continue.

Figure 7A:
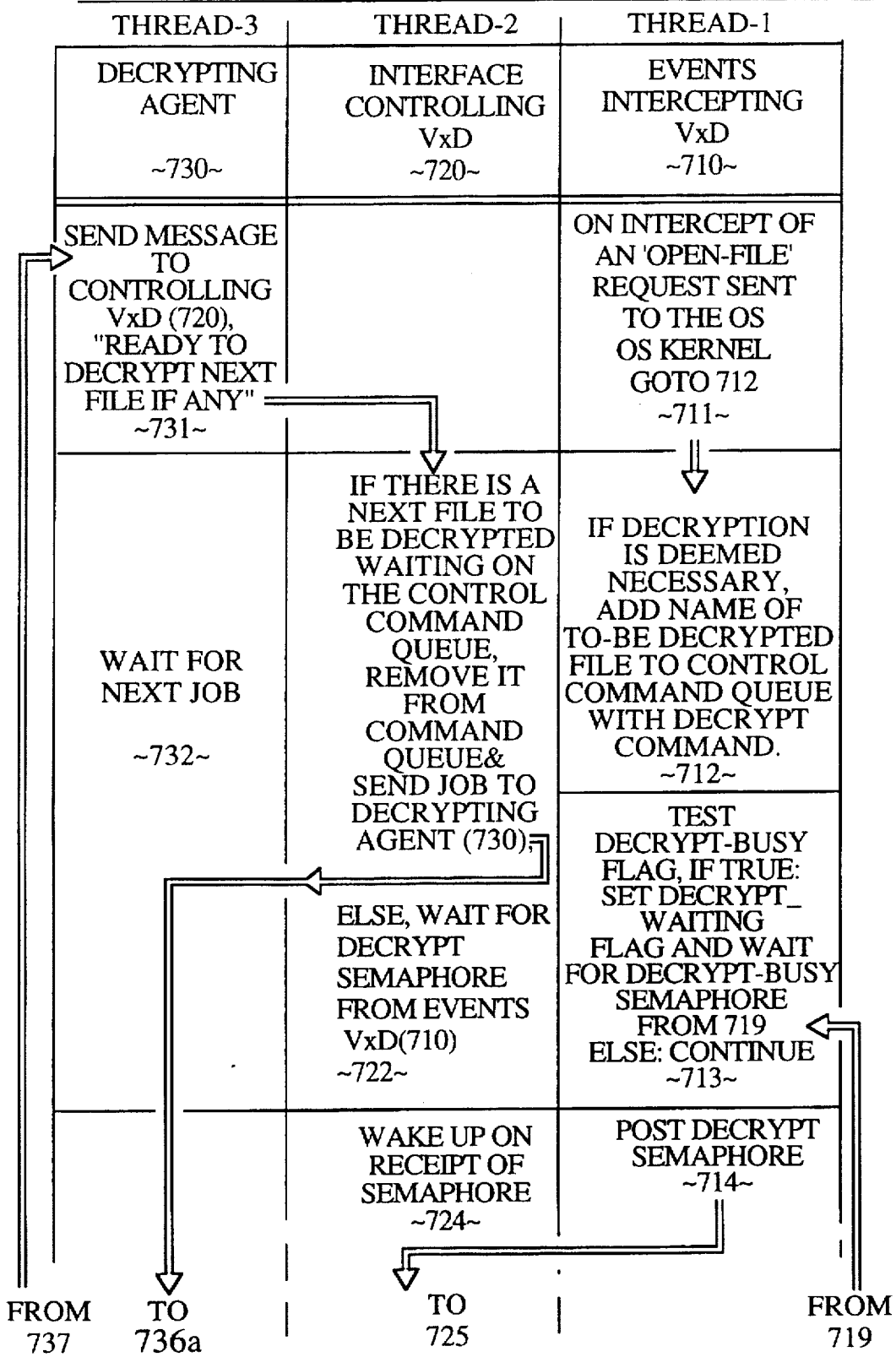
FIGS. 7A–7B illustrate how the file-OPEN intercept works in a multi-threaded environment.
Figure 7B:
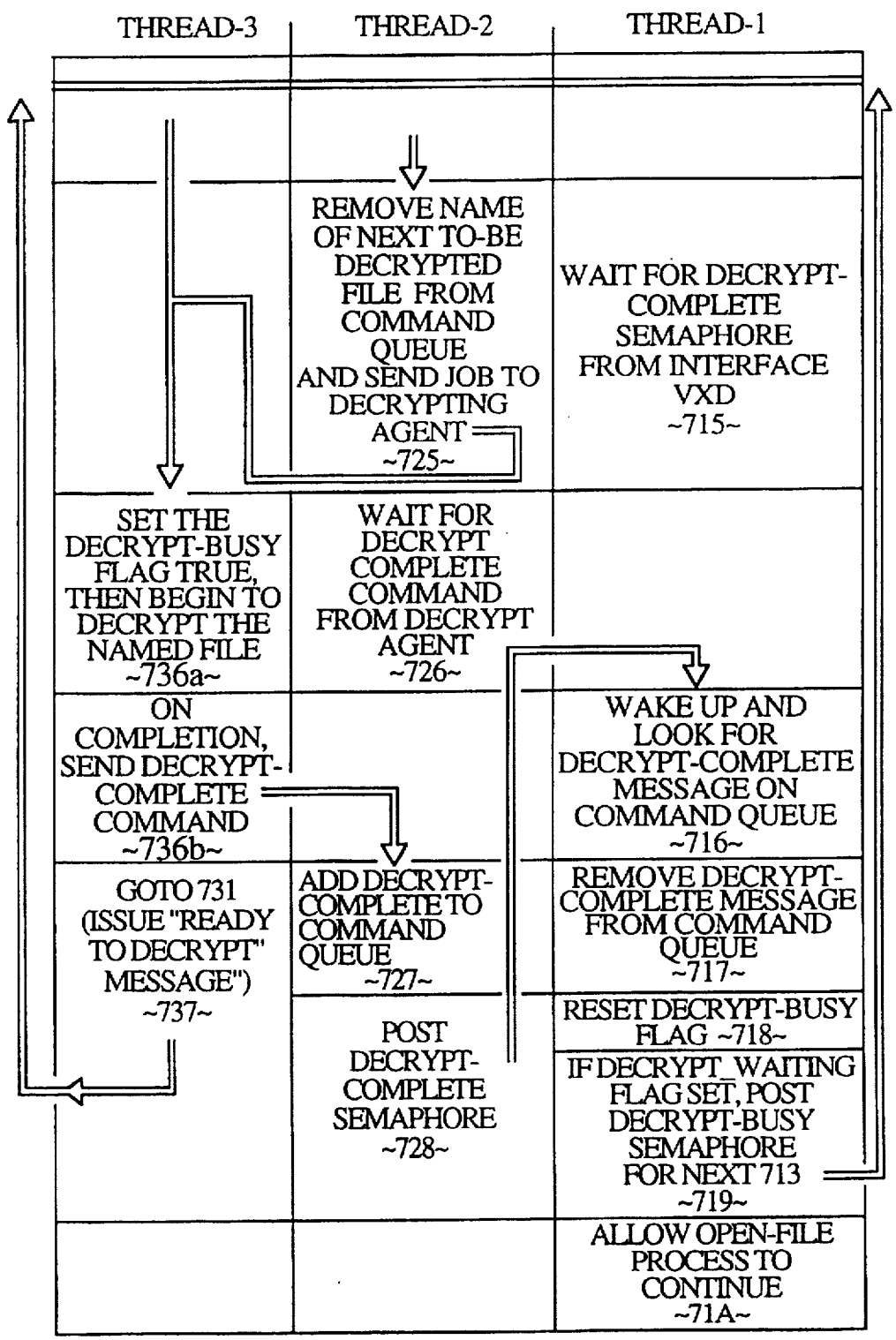

FIGS. 7A–7B illustrate how a VxD embodiment of the file-OPEN intercept routine 200 works in a multi-threaded environment. Inter-thread and intra-thread semaphores and flags are used to provide communication and synchronism between: (1) an events-intercepting first VxD 710; (2) an interface-controlling second VxD 720; and (3) a decrypting agent 730.

The first VxD 710, second VxD 720 and agent 730 are shown to be running as concurrent threads each in a respective one of the three columns labelled: THREAD-1, THREAD-2, and THREAD-3. At the bottom of the execution column of each respective thread, an automatic branch is executed back to the top of the thread (back to the top of the respective execution column. Thus, for example, after the bottom step 71A (FIG. 7B) of THREAD-1 completes, THREAD-1 automatically continues its execution at its top step 711.

THREAD-1 operates in the context of an executing application program thread because THREAD-1 is invoked by interception of a file-OPEN request. Since there can be many application program threads running at the same time in a multi-threaded system, it is possible for multiple instances of THREAD-1 to be invoked at the same time. Each of THREAD-2 and THREAD-3 services one instance of THREAD-1 at a time in the below-described embodiment.

An alternate embodiment can be provided that generates fresh instances of each of THREAD-2 and THREAD-3 for each freshly invoked instance of THREAD-1. However, such an alternate embodiment would suffer the performance overhead cost of invoking two new threads (THREAD-2 and THREAD-3) with each file-OPEN rather than invoking each of THREAD-2 and THREAD-3 just one time at system initialization. (THREAD-1 is code that executes within the anyways invoked thread of an application program and thus does not constitute much additional overhead.)

Although the example of FIGS. 7A–7B is directed to the file-OPEN process, it should be apparent that a similar scheme can be used for the file-CLOSE process. In the latter process, the events-intercepting first VxD 710 works with file-CLOSE events rather than file-OPEN's; the interface-controlling second VxD 720 looks for encryption commands and flags rather than decryption commands and flags; and the agent 730 is an encrypting agent rather than a decrypting agent.

Referring to FIG. 7A, after system initialization, the decrypting agent 730 sends a message 'Ready to Decrypt Next File If Any' to the interface-controlling VxD 720 as indicated in box 731. Thereafter, the decrypting agent 730 sits waiting for a next job as indicated at 732.

At the same time, the events-intercepting VxD 710 is in a sleep mode and does not get invoked until a next open-FILE request is intercepted as it is sent from an executing application program to the operating system kernel as indicated at 711.

On the intercept of such an file-OPEN request, THREAD-1 proceeds to step 712 where it determines whether decryption is necessary for the to-be-opened file. If decryption is deemed necessary, a DECRYPT COMMAND is added to a system command queue together with the name of the to-be-decrypted file.

Referring to box 713, sometimes multiple application programs are executing in time-shared parallelism and more than one file-OPEN request may be sent to the OS kernel at roughly the same time. To keep all threads 720 and 730 in approximate synchronism each invocation of thread 710, an interlocking procedure is carried out at step 713. A DECRYPT-BUSY FLAG (which flag is set by the decrypting agent at step 736a of FIG. 7B) is tested. If the DECRYPT-BUSY FLAG is false, that means either that the decrypting agent 730 had not yet set that flag in step 736a or that a previous invocation of the events-intercepting VxD 710 had reset the DECRYPT-BUSY FLAG at step 718 and the decrypting agent 730 had not thereafter turned around and again set that same flag at step 736a.

Upon a false DECRYPT-BUSY FLAG, the process in THREAD-1 continues to step 714 where it posts a DECRYPT SEMAPHORE for the interface-controlling VxD 720.

If, on the other hand, the DECRYPT-BUSY FLAG is found to be true in step 713, a DECRYPT_WAITING FLAG is set in step 713 and THREAD-1 idles until it receives a decrypt-busy semaphore from step 719 of a previously invoked execution of the same thread 710.

Meanwhile, in step 722, the interface-controlling VxD 720 has been scanning the command queue for a next command to execute. If there is such a command, the interface-controlling VxD 720 removes that next command from the command queue, and if it is a 'DECRYPT filename' command, the interface-controlling VxD 720 sends the corresponding job to the decrypting agent 730. Otherwise, the interface-controlling VxD goes to sleep and waits for a DECRYPT SEMAPHORE from the events-intercepting VxD 710.

Upon receipt in box 724 of the DECRYPT SEMAPHORE posted in box 714, the interface-Controlling VxD 720 awakens and proceeds to step 725.

In step 725 (FIG. 7B), the 'DECRYPT filename' command is removed from the command queue and the corresponding job is sent to the decrypting agent.

In step 736a of THREAD-3, the decrypting agent 730 sets the DECRYPT-BUSY FLAG true and then begins to decrypt the named file.

In the meantime, the interface-controlling VxD 720 goes to sleep in step 726 waiting for a DECRYPT-COMPLETE COMMAND from box 736b of the decrypting agent 730.

Within this interlocking sequence of events, the corresponding invocation of the events-intercepting VxD 710 goes to sleep at 715 waiting to wake up upon receipt of a DECRYPT-COMPLETE SEMAPHORE from box 737 of the interface-controlling VxD 720.

On completion of its decryption job, the decrypting agent 730 posts the DECRYPT-COMPLETE COMMAND as indicated in box 736b. Then it returns through box 737 to box 731 and posts the next message 'Ready to Decrypt Next File If Any' for the interface-controlling VxD 720 as indicated in box 731.

In response to the DECRYPT-COMPLETE COMMAND, at step 727, the interface-controlling VxD 720 adds a DECRYPT-COMPLETE MESSAGE to the command queue for receipt by the sleeping events-intercepting VxD 710. Then in box 728, it posts the DECRYPT COMPLETE SEMAPHORE.

In response, the sleeping events-intercepting VxD 710 wakes up at step 716 and starts scanning the command queue for a DECRYPT-COMPLETE MESSAGE which is to be received from the interface-controlling VxD 720.

When it finds the message, the events-intercepting VxD 710 responsively advances to step 717 wherein it removes the DECRYPT-COMPLETE MESSAGE from the command queue, and thereafter in step 718 resets the DECRYPT-BUSY FLAG to flase.

In step 719, if the DECRYPT_WAITING FLAG had been set earlier in step 713, a DECRYPT-BUSY SEMAPHORE is now posted in step 719 for receipt by the next invocation of step 713.

Thereafter, in step 71A, the events-intercepting VxD 710 retires and allows the file-OPEN process to continue with a normal file-opening. The events-intercepting VxD 710 reawakens at step 711 upon interception of a next file-OPEN request.

The above disclosure is to be taken as illustrative of the invention, not as limiting its scope or spirit. Numerous modifications and variations will become apparent to those skilled in the art after studying the above disclosure.

By way of example, in a database system where data is routinely accessed (read from and/or written to) as integral units of finer granularity than 'files'; for example, where data is routinely accessed as 'database records' rather than as integral files', the recryption intercept routines may be modified to respond at the appropriate level of finer granularity. For example, the recryption intercept routines may be modified to respond to database_record-OPEN and database_record-CLOSE requests rather than responding to respective file-OPEN and file-CLOSE requests.

By way of further example, although it is implied above that encryption and decryption are carried out by the CPU 120 or another like processor means in response to the OTF instruction code 163, it is within the contemplation of the invention to alternatively or supplementally use dedicated hardware (and/or firmware) mechanisms for carrying out part or all of one or both the encrypting and decrypting functions. The dedicated hardware can be in the form of a special purpose function board or chip that is operatively coupled to the system bus 110 for carrying out the respective encrypting and decrypting functions.

Similarly other software-implemented functions can be carried out with dedicated hardware as desired. For example, part or all of the data for the collection 165 of encryption and decryption keys and algorithms can be stored in a secured ROM chip or in a secured CD-ROM platter that is operatively coupled to the system bus 110 rather than in the disk subsystem 150. Part or all of the data for the collection 165 of encryption and decryption keys and algorithms can be stored in a separate file-server computer and can be downloaded over a network and through the system I/O module 130 to the system memory 140 on an as needed basis. The various confidential files 161–162 and 169, the exclusion and inclusion lists 155–157, the special-use lists 167, and even the OTF instruction code 163 can be similarly stored in other means and brought into system memory 140 on an as needed basis through various mechanisms such as system I/O module 130 and data conveyance means 131.

Given the above disclosure of general concepts and specific embodiments, the scope of protection sought is to be defined by the claims appended hereto.

What is claimed is:

1. A machine system for maintaining confidential information generally in encrypted form while allowing for decryption of such confidential information into temporary plaintext form, said machine system comprising:

(a) a memory storing a plurality of digital data files, wherein each of said files is organized as belonging to one of at least first and second directories or subdirectories, and further wherein at least a first file among said files belongs to a corresponding one of said directories or subdirectories, and said first file contains first data representing a pre-encrypted form of confidential first information;

(b) a decrypting mechanism for decrypting ciphertext data into plaintext data;

(c) recryption control means for selecting one of the files stored in said memory and for causing the decrypting mechanism to decrypt data contained in the selected file and for automatically later eliminating the decrypted data, (c.1) wherein said recryption control means is responsive to a supplied directory exclusion list, the directory exclusion list identifying one or more directories or subdirectories whose files are to be excluded from being selected by the recryption control means for decryption, and wherein the recryption control means accordingly does not select files identified by the directory exclusion list for decryption by the decrypting mechanism.

2. A machine-implemented method for maintaining confidential information generally in encrypted form while allowing for selective decryption of such confidential information into temporary plaintext form, said machine-implemented method being carried out in machine system that stores a plurality of digital data files, wherein each of said files is organized as belonging to one of at least first and second directories or subdirectories, and further wherein at least a first file among said files belongs to a corresponding one of said directories or subdirectories, and said first file contains first data representing a pre-encrypted form of confidential first information; wherein said machine system further includes:

a decrypting mechanism for decrypting ciphertext data into plaintext data; and recryption control means for selecting one of the files stored in said memory and for causing the decrypting mechanism to decrypt data contained in the selected file and for automatically later eliminating the decrypted data;

said method comprising the steps of:

(a) receiving a supplied directory exclusion list, where the received directory exclusion list identifies one or more directories or subdirectories whose files are to be excluded from being selected by the recryption control means for decryption; and (b) responsively controlling the recryption control means in accordance with the directory exclusion list such that the recryption control means does not select files identified by the directory exclusion list for decryption by the decrypting mechanism.

3. A data conveying apparatus having on-the-fly recryption control code defined therein for execution by a predefined code executing unit, the on-the-fly recryption control code being for allowing selective decryption of confidential information into temporary plaintext form, said selective decryption being carried out in machine system that stores a plurality of digital data files, wherein each of said files is organized as belonging to one of at least first and second directories or subdirectories, and further wherein at least a first file among said files belongs to a corresponding one of said directories or subdirectories, and said first file contains first data representing a pre-encrypted form of confidential first information; wherein said machine system further includes:

a decrypting mechanism for decrypting ciphertext data into plaintext data; and recryption control means for selecting one of the files stored in said memory and for causing the decrypting mechanism to decrypt data contained in the selected file and for automatically later eliminating the decrypted data; said on-the-fly recryption control code comprising:

(a) receiving means for receiving a supplied directory exclusion list, where the received directory exclusion list identifies one or more directories or subdirectories whose files are to be excluded from being selected by the recryption control means for decryption; and (b) exclusion list responding means for responsively controlling the recryption control means in accordance with the directory exclusion list such that the recryption control means does not select files identified by the directory exclusion list for decryption by the decrypting mechanism.

4. A machine system for maintaining confidential information generally in encrypted form while allowing for decryption of such confidential information into temporary plaintext form, said machine system comprising:

(a) a memory storing a plurality of digital data files, wherein at least a first file among said files is accessible to a corresponding one of plural application programs, and said first file contains first data representing a pre-encrypted form of confidential first information;

(b) a decrypting mechanism for decrypting ciphertext data into plaintext data;

(c) recryption control means for selecting one of the files stored in said memory and for causing the decrypting mechanism to decrypt data contained in the selected file and for automatically later eliminating the decrypted data, (c.1) wherein said recryption control means is responsive to a supplied, programs exclusion list, the programs exclusion list identifying one or more application programs whose accessed files are to be excluded from being selected by the recryption control means for decryption when accessed by a program identified in the programs exclusion list, and wherein the recryption control means accordingly does not select files for decryption by the decrypting mechanism when such files are accessed by a program identified by the programs exclusion list.

5. A machine-implemented method for maintaining confidential information generally in encrypted form while allowing for selective decryption of such confidential information into temporary plaintext form, said machine-implemented method being carried out in machine system that stores a plurality of digital data files, wherein at least a first file among said files is accessible to a corresponding one of plural application programs, and said first file contains first data representing a pre-encrypted form of confidential first information; wherein said machine system further includes:

a decrypting mechanism for decrypting ciphertext data into plaintext data; and recryption control means for selecting one of the stored files and for causing the decrypting mechanism to decrypt data contained in the selected file and for automatically later eliminating the decrypted data;

said method comprising the steps of:

(a) receiving a supplied programs exclusion list, where the received programs exclusion list identifies one or more application programs whose accessed files are to be excluded from being selected by the recryption control means for decryption when such files are accessed by a program identified by the programs exclusion list; and (b) responsively controlling the recryption control means in accordance with the programs exclusion list such that the recryption control means does not select files identified by the programs exclusion list for decryption by the decrypting mechanism when such files are accessed by a program identified by the programs exclusion list.

6. A data conveying apparatus having on-the-fly recryption control code defined therein for execution by a predefined code executing unit, the on-the-fly recryption control code being for allowing selective decryption of confidential information into temporary plaintext form, said selective decryption being carried out in machine system that stores a plurality of digital data files, wherein at least a first file among said files is accessible to a corresponding one of plural application programs, and said first file contains first data representing a pre-encrypted form of confidential first information; wherein said machine system further includes:

a decrypting mechanism for decrypting ciphertext data into plaintext data; and recryption control means for selecting one of the files stored in said memory and for causing the decrypting mechanism to decrypt data contained in the selected file and for automatically later eliminating the decrypted data; said on-the-fly recryption control code comprising:

(a) receiving means for receiving a supplied programs exclusion list, where the received programs exclusion list identifies one or more application programs whose accessed files are to be excluded from being selected by the recryption control means for decryption when such files are accessed by a program identified by the programs exclusion list; and (b) exclusion list responding means for responsively controlling the recryption control means in accordance with the programs exclusion list such that the recryption control means does not select files identified by the programs exclusion list for decryption by the decrypting mechanism when such files are accessed by a program identified by the programs exclusion list.

7. A machine system having an operating system and a corresponding environment that supports multi-threaded operations, said machine system comprising:

(a) a decrypting agent that defines a first thread in said multi-threaded environment;

(b) a decrypting mechanism which can be invoked by the decrypting agent, said decrypting mechanism being for decrypting ciphertext data into plaintext data when invoked by the decrypting agent;

(c) recryption control means for determining for a plurality of files whether certain ones of the files are to be decrypted; and (d) an events intercepting mechanism that operates as a second thread in said multi-threaded environment, the events intercepting mechanism including:

(d.1) request intercepting means for intercepting requests sent to the operating system and detecting file-OPEN ones of the intercepted requests that request the opening of respective files; and (d.2) consulting means, operatively coupled to the recryption control means, for consulting with the recryption control means to determine whether decryption is to be carried out for the respective files associated with the intercepted file-OPEN requests, and if so, for adding an identification of each such file to a to-be-executed queue of control commands, where said to-be-executed queue of control commands is operatively coupled to said threaded, decrypting agent.

8. A machine system according to claim 7 wherein said recryption control means is responsive to at least a supplied one of:

(b.1) a directories exclusion list that identifies one or more directories or subdirectories whose files are to be excluded from being designated by the recryption control means for decryption;

(b.2) a directories inclusion list that identifies one or more directories or subdirectories whose files are to be designated by the recryption control means for decryption;

(b.3) a files exclusion list that identifies one or more files which are to be excluded from being designated by the recryption control means for decryption; and (b.4) a programs exclusion list that identifies one or more application programs whose accessed files are to be excluded from being selected by the recryption control means for decryption when such files are accessed by a program identified by the programs exclusion list.

9. A machine system according to claim 8 wherein said recryption control means is responsive to at least both of:

(b.1a) the directories exclusion list; and (b.3a) the files exclusion list; and wherein (b.5) the recryption control means responds to the directories exclusion list before being able to respond to the files exclusion list.

10. A machine system according to claim 8 wherein said recryption control means is responsive to at least both of:

(b.1a) the directories inclusion list; and (b.3a) the files exclusion list; and wherein (b.5) the recryption control means responds to the directories inclusion list before being able to respond to the files exclusion list.

11. A machine system according to claim 7 further comprising:

(d) an interfacing mechanism that operates as a third thread in said multi-threaded environment, the events interfacing mechanism including:

(e.1) first detecting means, operatively coupled to the events intercepting mechanism, for detecting an adding of an identification of a to-be-decrypted file to the to-be-executed queue of control commands by the events intercepting mechanism; and (e.2) second detecting means, operatively coupled to the decrypting agent, for detecting completion of a decrypting operation by the decrypting agent.

12. A machine-implemented method for use with an operating system and a corresponding environment that supports multi-threaded operations, where said machine system includes:

a decrypting agent that defines a first thread in said multi-threaded environment;

a decrypting mechanism which can be invoked by the decrypting agent, said decrypting mechanism being for decrypting ciphertext data into plaintext data when invoked by the decrypting agent; and recryption control means for determining for a plurality of files whether certain ones of the files are to be decrypted;

said method operating as a second thread in said multi-threaded environment and comprising the steps of:

(a) intercepting requests sent to the operating system;

(b) detecting file-OPEN ones of the intercepted requests that request the opening of respective files; and (c) consulting with the recryption control means to determine whether decryption is to be carried out for the respective files associated with the intercepted file-OPEN requests, and if so, communicating with the decrypting agent so as to invoke decryption of the so-identified files that are to-be decrypted.

13. A data conveying apparatus having on-the-fly recryption control code defined therein for execution by a predefined code executing unit, the on-the-fly recryption control code being for allowing selective decryption of confidential information into temporary plaintext form, said selective decryption being carried out in a machine system having an operating system and a corresponding environment that supports multi-threaded operations, said machine system further having a plurality of digital data files, wherein at least a first file among said files is accessible to a corresponding one of plural application programs that run under the operating system, and said first file contains first data representing a pre-encrypted form of confidential first information; wherein said on-the-fly recryption control code comprises:

(a) a decrypting agent means that defines a first thread in said multi-threaded environment;

(b) a decrypting mechanism which can be invoked by the decrypting agent means, said decrypting mechanism being for decrypting ciphertext data into plaintext data when invoked by the decrypting agent means;

(c) recryption control means for determining for a plurality of files whether certain ones of the files are to be decrypted; and (d) an events intercepting means that operates as a second thread in said multi-threaded environment, the events intercepting means including:

(d.1) request intercepting means for intercepting requests sent to the operating system and detecting file-OPEN ones of the intercepted requests that request the opening of respective files; and (d.2) consulting means, operatively coupled to the recryption control means, for consulting with the recryption control means to determine whether decryption is to be carried out for the respective files associated with the intercepted file-OPEN requests, and if so, for adding an identification of each such file to a to-be-executed queue of control commands, where said to-be-executed queue of control commands is operatively coupled to said threaded, decrypting agent.

* * * * *

UNITED STATES PATENT AND TRADEMARK OFFICE
CERTIFICATE OF CORRECTION

PATENT NO. : 5,796,825
DATED : August 18, 1998
INVENTOR(S) : William D. McDonnal et al.

It is certified that error appears in the above-indentified patent and that said Letters Patent is hereby corrected as shown below:

Column 10, line 51, "c:\" should be --c:\u--.
Column 22, line 15, delete "is".

Signed and Sealed this

Twenty-fifth Day of May, 1999

Attest:

Q. TODD DICKINSON

Attesting Officer    Acting Commissioner of Patents and Trademarks